(12) United States Patent
Enlow et al.

(10) Patent No.: US 6,254,712 B1
(45) Date of Patent: Jul. 3, 2001

(54) EXTRUSION COATING PROCESS FOR MAKING HIGH TRANSPARENCY PROTECTIVE AND DECORATIVE FILMS

(75) Inventors: Howard H. Enlow, Munster; John J. Markey, Crown Point; John E. Roys, Lowell; Keith L. Truog, Crown Point; Frederick Young, Schererville, all of IN (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/256,967

(22) Filed: Feb. 24, 1999

Related U.S. Application Data

(63) Continuation-in-part of application No. 08/793,836, filed as application No. PCT/WO96/40480 on Jun. 7, 1996.
(60) Provisional application No. 60/111,446, filed on Dec. 8, 1998.

(51) Int. Cl.⁷ .............................. B29C 31/00; B29C 47/00
(52) U.S. Cl. ............................. 156/244.11; 156/244.23; 156/324; 264/176.1; 427/209
(58) Field of Search .................... 156/244.11, 244.23, 156/324; 264/DIG. 65, 176.1; 427/209

(56) References Cited

U.S. PATENT DOCUMENTS

| | | | |
|---|---|---|---|
| 3,880,690 | 4/1975 | Fuchs et al. | 156/242 |
| 4,121,535 | 10/1978 | Roberts, Jr. et al. | 118/5 |
| 4,268,464 | 5/1981 | Yoshino et al. | 264/22 |

(List continued on next page.)

FOREIGN PATENT DOCUMENTS

| | | |
|---|---|---|
| 4228194 A1 | 3/1994 | (DE) . |
| 0 137 581 A1 | 4/1985 | (EP) . |
| 0 356 924 A2 | 3/1990 | (EP) . |
| 02165149 | 6/1990 | (EP) . |
| 0 547 506 A1 | 6/1993 | (EP) . |
| 1 225 438 | 3/1971 | (GB) . |
| 2084513 | 4/1982 | (GB) . |
| 61-8349 | 1/1986 | (JP) . |
| 62-138213 | 6/1987 | (JP) . |
| 11536 | 6/1994 | (JP) . |
| WO9403337 | 2/1994 | (WO) . |

OTHER PUBLICATIONS

"Long–Term Photoprotection of Polymers by Coextrusion with PVDF" by Albert Strassel, 1989.

*Primary Examiner*—Sam Chuan Yao
(74) *Attorney, Agent, or Firm*—Christie, Parker & Hale, LLP

(57) ABSTRACT

A process for making a protective and decorative surfacing film comprises extrusion coating a solventless polymeric material from an extruder die to form an optically clear first layer on a polyester carrier sheet traveling past the extruder die opening. The extrusion coated first layer is immediately cooled on the carrier sheet to harden it, followed by applying a pigmented second layer to the first layer. The composite paint coat is transferred to a reinforcing backing sheet, after which the carrier sheet is separated from the paint coat to expose the outer surface of the first layer as a high gloss surface with a high distinctness-of-image, providing a transparent protective outer coat for the pigmented second layer. The pigmented second layer can be solvent cast and dried or extruded and hardened as a separate coating on the first layer. The composite paint coat can be bonded to a coextruded size coat and semi-rigid plastic substrate panel to form a thermoformable laminate. Techniques are disclosed for producing extruded clear films of exceedingly high optical clarity using a closed air flow transport and HEPA filtration system that removes airborne particles from the resin handling and extrusion process, thereby preventing micron-sized contaminants naturally present from many sources from entering the process and degrading ultimate film quality.

26 Claims, 8 Drawing Sheets

U.S. PATENT DOCUMENTS

| | | | |
|---|---|---|---|
| 4,317,860 | 3/1982 | Strassel | 428/421 |
| 4,364,886 | 12/1982 | Strassel | 264/171 |
| 4,415,519 | 11/1983 | Strassel | 264/171 |
| 4,440,702 * | 4/1984 | Susnjara | 264/34 |
| 4,500,706 * | 2/1985 | Mathis et al. | 528/502 |
| 4,585,694 | 4/1986 | Dehennau | 428/355 |
| 4,585,701 | 4/1986 | Bartoszek et al. | 428/421 |
| 4,810,540 | 3/1989 | Ellison et al. | 428/31 |
| 4,832,991 | 5/1989 | Hayward et al. | 427/393.5 |
| 4,854,995 | 8/1989 | Kasper et al. | 156/243 |
| 4,877,683 | 10/1989 | Bragaw, Jr. et al. | 428/421 |
| 4,902,557 | 2/1990 | Rohrbacher | 428/215 |
| 4,931,324 | 6/1990 | Ellison et al. | 428/31 |
| 4,936,936 | 6/1990 | Rohrbacher | 156/239 |
| 4,959,189 | 9/1990 | Rohrbacher et al. | 264/510 |
| 4,985,284 | 1/1991 | Shibata et al. | 427/428 |
| 5,030,394 | 7/1991 | Sietses et al. | 264/28 |
| 5,114,789 | 5/1992 | Reafler | 428/328 |
| 5,164,245 | 11/1992 | Suzuki | 428/201 |
| 5,203,941 | 4/1993 | Spain et al. | 156/209 |
| 5,223,311 | 6/1993 | Tsutsumi et al. | 427/388.1 |
| 5,322,899 | 6/1994 | Grunewalder et al. | 525/199 |
| 5,455,073 * | 10/1995 | Dethlefs et al. | 427/296 |
| 5,707,697 | 1/1998 | Spain et al. | 428/31 |
| 5,985,079 * | 11/1999 | Ellison | 156/244.23 |

* cited by examiner

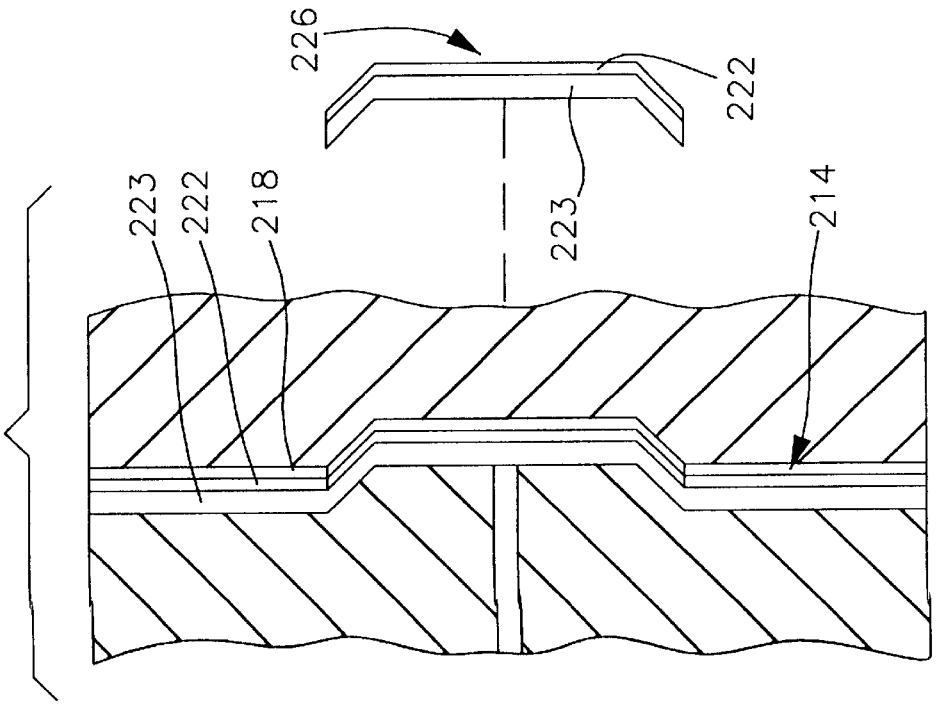
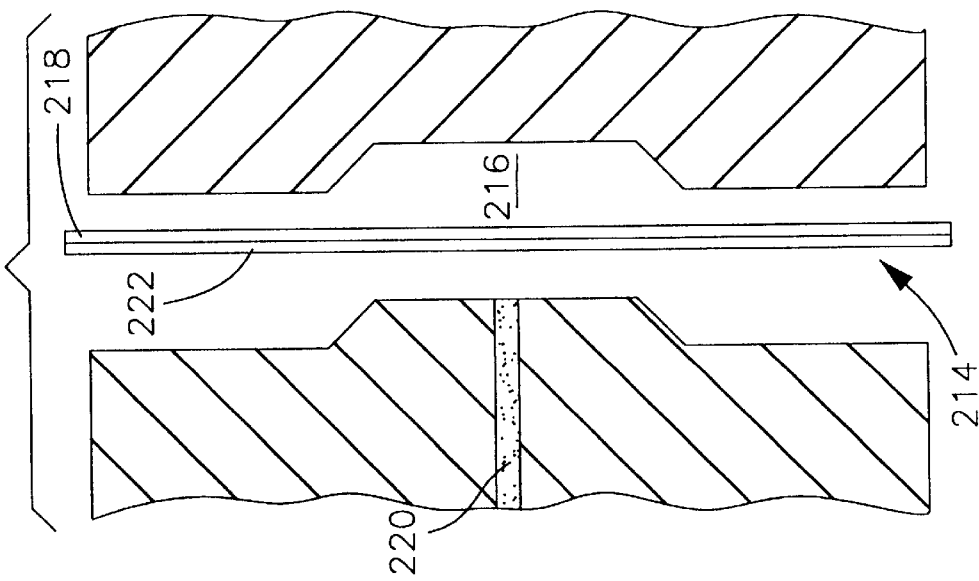

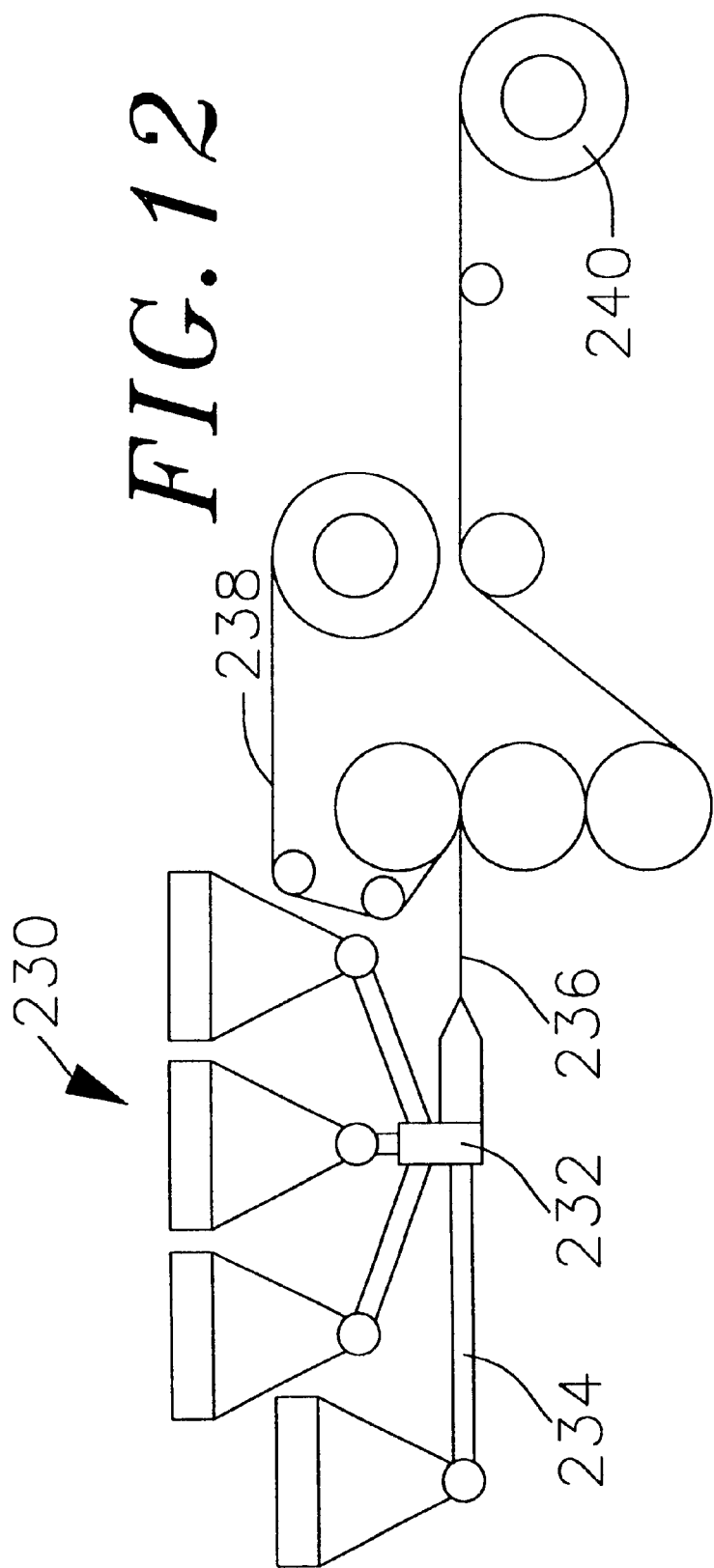

EXTRUSION COATING PROCESS FOR MAKING HIGH TRANSPARENCY PROTECTIVE AND DECORATIVE FILMS

CROSS-REFERENCE TO RELATED APPLICATION

This is a continuation-in-part of application Ser. No. 08/793,836, filed Aug. 6, 1997, which was published as International Application No. WO 96/40480, the entire subject matter of which is incorporated herein by this reference, and this application also claims the priority of Provisional application No. 60/111,446, filed Dec. 8, 1998.

FIELD OF THE INVENTION

This invention relates generally to the use of solventless extrusion coating techniques for forming high transparency protective films and multi-layer paint coated films and laminates. More particularly, coatings are made by extrusion coating one or more layers onto a carrier sheet to produce films of high optical quality at high speeds while avoiding solvent emission problems characteristic of the use of solvent-based coatings. Techniques are also disclosed for removing multiple sources of defects from the resin manufacturing, handling and extrusion process, with the result that extruded clear films can be produced with an essentially defect-free glass-like clarity.

BACKGROUND OF THE INVENTION

The present invention is described below with respect to its application to the manufacture of exterior automotive body panels, although other end-uses of the films made by this invention also are considered to be within the scope of this invention.

Exterior automotive body panels have been made in the past by spray painting sheet metal parts. Multi-layer paint coats, such as those referred to as a clear coat/color coat paint finish, have been used to produce desirable optical effects. In addition to high gloss and high distinctness-of-image (DOI), these paint coats also are highly durable by providing chemical resistance, abrasion resistance and weatherability that significantly reduces degradation by ultraviolet light.

In more recent years molded plastic car body panels have been made with decorative clear coat/color coat paint films bonded to the molded plastic panel. Use of such films avoids certain environmental problems associated with evaporation of paint solvents while also reducing or eliminating the need for paint facilities and emission controls at the automotive production plant.

Because of the growing need to reduce the amount of atmospheric pollution caused by solvents emitted during the painting process, many different approaches have been taken in recent years for producing these decorative films. These processes are generally categorized by solution casting techniques or extrusion techniques. For instance, U.S. Pat. Nos. 4,810,540 to Ellison et al. and 4,902,557 to Rohrbacher use solution casting techniques in which liquid-cast, solvent-based clear coats and pigmented base coats are applied to a flexible casting sheet by a coating process such as reverse roll coating or gravure printing. The liquid cast layers are separately applied and then dried at high temperatures to evaporate the solvents.

As an alternative, extruded films have been used for making exterior automotive clear coat/color coat films. International Application PCT US93 07097 to Duhme describes a process in which an injection molded laminate is made from an extruded clear coat layer, a color coat layer, a reinforcing layer laminated to the color coat layer, a bonding layer on a side of the reinforcing layer opposite from the color coat, and an injection molded substrate bonded to the bonding layer. The outer clear coat layer is a coextruded sheet having different proportions of polyvinylidene fluoride (PVDF) and acrylic resins in each layer of the coextrusion. An extruded thermoplastic liner layer is laminated to the outer surface of the clear coat layer to assist in injection molding the paint film laminate to the substrate. The coextruded outer clear coat layer is laminated to a polyester carrier which supports the clear coat layer during subsequent lamination steps. The outer clear coat layer can optionally be extruded onto the thermoplastic liner layer to provide gloss control. The color coat is made by solvent casting it on a carrier and laminating the dried paint coat to the clear coat. The reinforcing layer is laminated to the exposed side of the color coat, and the bonding layer may be coated on or laminated to the reinforcing layer. This process involves time-consuming multiple coating and lamination steps and slow processing speeds disclosed in the various examples.

U.S. Pat. Nos. 4,317,860 and 4,364,886 to Strassel also disclose coextrusion of multi-layer films such as a two-layer coextrusion of predominantly PVDF on one side and a predominantly acrylic resin on the other side of the coextruded sheet. These unitary structures are used to make molded articles, or to adhere the sheets to a molded polymer.

Film extrusion techniques also have been used in the past for making free films in which the extruded polymeric material is coated on a polished drum. These films are then undercoated with various color coats. The exterior surface of the extruded free film that contacts the drum (and is separated from the drum as a free film) does not have a high gloss and high distinctness-of-image. Also films manufactured in this manner do not have a carrier sheet attached, which makes them hard to handle and easily damaged in subsequent processing.

Another process disclosed in U.S. Pat. No. 5,114,789 to Reafler comprises a pigmented base coat which is solvent-die extrusion coated onto a flexible, stretchable carrier sheet and dried at elevated temperatures to evaporate the solvents, followed by extrusion coating a reactive clear coat on the base coat. The carrier film and extrusion coated paint layers are then heat softened as a unitary sheet and applied to a molded shaped substrate by a shrink wrap process.

In a currently used process for making exterior automotive paint films, a clear coat and color coat comprising blends of PVDF and acrylic resins are cast by reverse roll coater, either by solution or dispersion casting. The film thickness of the paint coats used in the process generally is dictated by end user requirements. In some instances the need to produce relatively thick films can impose certain production constraints. To adequately dry the material and to prevent air entrapment, line speeds are typically at 25 feet per minute. This slow throughput limits the coating capacity of the reverse roll coater and also releases a large amount of organic solvents. This solvent release is particularly evident when a solution-cast PVDF/acrylic clear coat is coated from a solvent-based solution having a relatively high amount of solvent. VOC emissions are high. PVDF has limited solubility and requires strong solvents to dissolve. One such solvent known as N-methyl pyrrolidone (trade name M-Pyrol) is either needed to solubilize the resin in solution casting or used as a coalescing aid in dispersion casting. In addition, cross contamination can occur from solubilizing residual material in previously used drums, hoses, pans, pumps, etc. Also, during coating, the strong solvent can dissolve caked-on resins in a drying oven, causing them to cascade down on the web being coated. As a further concern, these strong solvents are expensive.

Thus, there is a need for producing decorative and protective surfacing films while avoiding the adverse effects of low production line speed, high VOC, cross-contamination, and the use of expensive solvents.

Extrusion techniques can be an alternative that avoids the use of strong solvents and their related solvent emission problems. Extrusion techniques such as those described above, however, have not been successfully adapted to producing high optical quality films at high line speeds and at low cost.

Application Ser. No. 08/793,836 to Enlow et al. describes a solventless extrusion coating process that provides an alternative to both solvent casting and conventional extrusion of polymeric films. Use of the extrusion coating techniques of that invention provide the advantages of avoiding expensive solvents, producing no VOC emissions, and avoiding cross-contamination associated with solvent casting. In addition, the invention has the added advantages of greatly increasing line speed, eliminating steps in the manufacturing process, and reducing the cost of producing clear coat/color coat films. The invention has particular applicability to the manufacture of molded plastic exterior automotive body panels and parts, in that it provides a means for producing extruded high gloss, high DOI (distinctness-of-image) clear coat films of exterior automotive quality.

It has been recognized that solventless extrusion of polymeric materials into highly transparent, essentially defect-free thin film layers is extremely difficult. When such films are extruded for the purpose of providing a high gloss protective outer clear coat layer for an automotive laminate, for example, the layer is typically extruded as a thin film approximately one mil to three mils thick. However, the human eye catches the slightest defects in such a thin outer clear coat layer of high gloss and high DOI when compared with thicker films extruded as sheets or films that do not have the requirements of high gloss and high DOI.

It has also been recognized that even when a high gloss outer clear coat film is extruded as an essentially defect-free film, the film itself can replicate defects present in an underlying laminate to which it is bonded. For example, in an automotive laminate having an extruded polymeric backing sheet and size coat layer, defects can be telegraphed to the surface of a thin protective outer clear coat layer of high gloss. In this instance, defects as small in size as 10 microns or less in the extruded sub-layers can appear as noticeable defects in the high gloss outer clear coat layer.

Generally speaking, polymeric films which are solvent cast are more easily produced as defect-free clear coat films of high gloss and high DOI when compared with films made by solventless extrusion of polymeric materials. The difficulty arises when extruding engineering plastics as high gloss, high DOI clear coat films. The extrusion process by its nature generates defects in the extruded material and there are several sources of these defects, all of which must be addressed in order to ensure the optical clarity and smoothness of the finished extruded film. For example, application Ser. No. 08/793,836 to Enlow et al. describes how high shear and heat generation in an extruded material can cause induced haze and gel formation and resultant optical defects or reduced optical clarity in the extruded film. That publication also describes how reducing heat histories (minimizing heat rise) when compounding PVDF, acrylic and UV stabilizer starting materials can improve the quality of films made from those materials. Modifications to the extrusion process in order to avoid such problems, however, should not adversely affect subsequent thermoforming operations or unreasonably reduce line speed during the production process.

The formulation of the starting material also can affect optical clarity. For instance, an optically clear film made from a blend of PVDF and acrylic resins can be extruded more haze free when the PVDF component of the starting material is reduced from a level of 70% to below about 65%.

Although the effects of gel formation and induced haze are minimized by the processing techniques described above, it has been discovered that use of these processing controls may not categorically produce extruded clear films of extremely high transparency free of defects because additional defects can be introduced from other sources.

The present invention is based in part on a recognition that film quality of a solventless extruded clear film can be adversely affected by airborne particulate substances that may enter the extrusion process from a variety of sources. Failure to remove these contaminants from the process can result in noticeable defects in a thin extruded high gloss clear film. These defects can adversely affect the finished product whether they are present in the extruded outer clear coat film or in an underlying size coat and/or substrate panel to which the protective clear film is bonded.

It has been discovered that micron-size airborne contaminants from various sources can pass through the extrusion process and end up creating optical defects in the finished product. For, instance, dust particles 10 microns in diameter or less produce noticeable defects in an extruded transparent one mil thick high gloss film. Such defects from airborne contaminants also may not appear until the finished laminate is thermoformed which can cause the defects to appear at the surface. Such airborne contaminants can include not only dirt particles from the air but also fiberglass particles and polymer dust present in the production plant. These contaminants can be introduced into the extrusion process when the resinous starting materials are handled before or after film extrusion.

In addition, contaminants may be present in the resinous starting materials. Such contaminants may include glass fibers, carbon, metal bits and gels introduced from the resin manufacturing process.

Thus, a process for solventless extrusion of thin high gloss clear coat films must address the problems of: (1) avoiding gel formation and induced haze; (2) avoiding defects being introduced not only in an extruded outer clear coat film but also in underlying extruded substrate layers; (3) avoiding film handling problems while maintaining high production line speed; (4) avoiding introduction of contaminants from the starting materials and during the resin handling and extrusion process; and (5) providing a finished laminate that maintains high gloss and high DOI after the finished part is subjected to thermoforming temperatures and resultant elongation.

Although the invention is described above with respect to exterior automotive applications, the invention also has applicability as a protective and decorative coating for other articles such as interior automotive components, exterior siding panels and related outdoor construction products, marine products, signage, window glass and other interior or exterior film products. Vinyl (PVC) siding panels are an example of one use of the invention for producing outdoor weatherable decorative surfaces on extruded plastic sheets. The invention, however, is applicable to plastic substrate panels other than vinyl, such as polycarbonate, for example. The invention is particularly applicable to protective films having a requirement of high transparency free of optical defects, i.e., any protective film that would have glass-like optical properties.

SUMMARY OF THE INVENTION

The present invention provides a process for solventless extrusion of engineering resins to form highly transparent glass-like weatherable optically clear films essentially free of optical defects. The invention avoids introduction of defects from gel formation; avoids induced haze that reduces transparency; avoids defects present not only in an outer clear coat but also in an underlying coextruded bonding layer and supporting substrate panel; promotes material handling at high production speeds; avoids introducing airborne contaminants and other defects throughout the process that would otherwise cause micron size optical defects in thin high gloss extruded outer clear films; and produces thermoformable laminates that maintain high gloss and high DOI sufficient for exterior automotive use, as one example.

Briefly, one embodiment of this invention comprises a process for making a protective and decorative surfacing film comprising extrusion coating a solventless polymeric material from an extruder die directly onto a moving carrier sheet to form an extruded coating of uniform film thickness on the carrier sheet. The carrier sheet is preferably a high gloss, heat-resistant inelastic polymeric casting sheet. The extrusion coated layer is preferably formed as an optically clear first layer on the carrier which travels at high speed past the extruder die opening. The extrusion coated first layer is immediately hardened by a temperature reduction, such as by contact with chill roll, followed by applying a pigmented second layer in thin film form on the hardened first layer, to form a composite paint coat. In one embodiment this composite paint coat is laminated to a bonding layer coextruded with a supporting substrate sheet or panel. The carrier sheet is separated from the resulting laminate to expose an outer surface of the extrusion coated first layer as a high gloss surface with a high distinctness-of-image.

Another embodiment of the invention provides a process for the extrusion of high gloss, high transparency clear films from a particulate resinous starting material essentially free of airborne contaminants, comprising holding the resinous starting material in a container, withdrawing the resinous material from the container and passing at least a portion of the resinous material through a dryer, and transporting the dried resinous material to an extrusion apparatus. The resinous material is conveyed from the container through the dryer and to the extruder in a closed air flow transport system in which the resin transport air is subjected to high efficiency (HEPA) filtration to remove micron size contaminants (defined herein as particles lower than about 10 microns in diameter) from the airflow that transports the resinous material. The resinous material is extruded as a transparent film essentially free of micron size defects.

The system for removing airborne contaminants includes a closed airflow conveying system subjected to high efficiency (HEPA) air filtration for transporting the resinous materials (1) to the extruder, (2) to and from a blending apparatus when used for blending multiple resinous materials prior to extrusion, and (3) to and from the dryer for removing any moisture from the extrudable resinous materials. In addition to filtering transport air in the closed resin transport system, the invention also removes airborne particles from production equipment with which the extruded film comes in contact. This includes removal of airborne particles attracted to the carrier sheet web by static electric charges and steps for cleaning adherent particles from surfaces of the traveling carrier sheet before and after the extrusion step.

Such high efficiency (HEPA) air filtration is preferably adapted to remove any airborne particulate matter below five microns in diameter, and more preferably below one micron in diameter, from the resin handling and extrusion process.

Although various polymeric film-forming materials can be used for forming the extrusion coated outer layer, the preferred extrudable material is a blend or alloy of a fluoropolymer and an acrylic resin in which the fluoropolymer is preferably polyvinylidene fluoride (PVDF).

The pigmented second layer, in one embodiment, can be solvent cast onto the extrusion-coated first layer, or alternatively, the first and second layers can be formed as a coextrusion which is then coated onto the moving carrier sheet.

Other forms of the invention include coextruding various layers of the composite laminate including not only the clear coat and underlying color coat but also the size coat, tie coat and other functional coats as well, including the backing sheet or other substrate panel, sheet or film. The carrier can also be extruded in tandem with the other layers of the laminate. The HEPA filtration techniques for removing airborne particles from the resins are applicable to the extrusion of each of these component layers and their starting materials.

Since one or more layers of the composite paint coat can be extrusion coated using solid (solventless) polymers, the process avoids the use of expensive solvents and also avoids VOC emissions and cross-contaminations associated with solvent casting. The process also can reduce production time and costs. A line speed for extrusion coating can be at least 50 feet per minute and more commonly in excess of 200 feet per minute, as compared to 25 feet per minute for solvent casting techniques. In one embodiment, extrusion coating is carried out at a line speed in excess of 300 feet per minute and can be operated at a line speed approaching 380 feet per minute.

Such improvements in line speed and related improvements in quality of the extrudate are produced by controlling the compatibility of the blended polymeric materials that comprise the backbone of the extruded material. By matching the melt viscosities of the blended polymeric materials in that they are reasonably close to each other, the flow characteristics of the alloyed material when heated to the extrusion temperature produce a smooth, more uniform flow which also avoids stress formation and visual defects in the hardened film. The processing techniques for melt blending the starting materials and for extrusion coating the resultant film are especially useful when preparing transparent films from alloys of PVDF and acrylic resins.

These techniques when combined with the HEPA filtration removal of airborne particles produce films and laminates of exceedingly high optical clarity.

These and other aspects of the invention will be more fully understood by referring to the following detailed description and the accompanying drawings.

BRIEF DESCRIPTION OF THE DRAWINGS

FIGS. 10 and 11 are schematic cross-sectional diagrams illustrating an in-mold process where a laminate is placed directly into an injection mold and molded into a finished panel.

FIG. 12 is a schematic diagram illustrating an embodiment in which a substrate is coextruded in sheet form, followed by extrusion coating a size coat, a color coat and a clear coat, followed by introduction of a carrier sheet.

DETAILED DESCRIPTION

Figure 1:
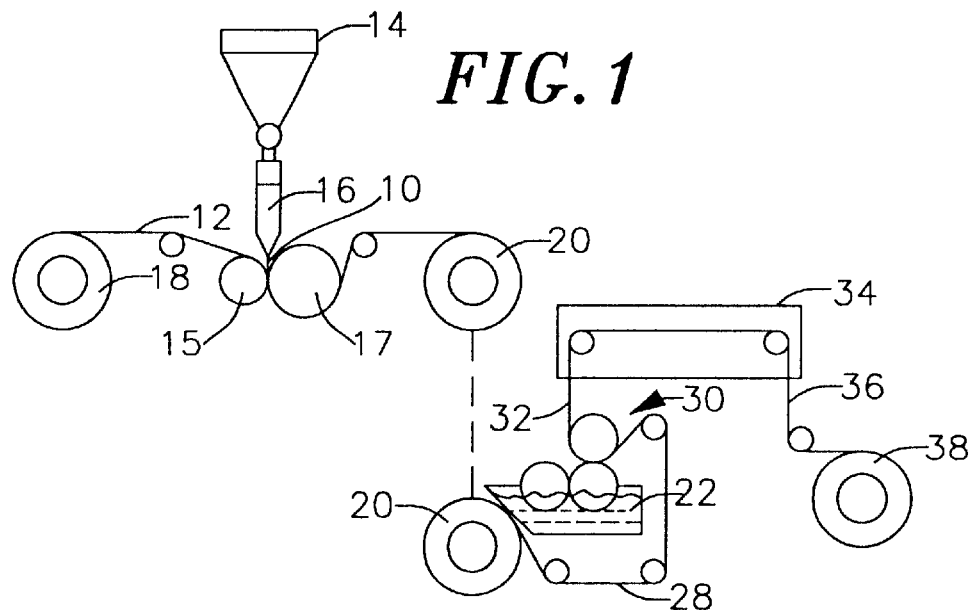
FIG. 1 is a schematic diagram generally illustrating one embodiment of the invention in which a clear coat is extrusion coated onto a carrier sheet followed by a solvent cast color coat.

FIG. 1 schematically illustrates one embodiment of the invention in which a clear coat film 10 (also referred to as a clear topcoat) is extrusion coated onto a flexible carrier sheet 12. The carrier sheet is preferably a flexible, heat-resistant, inelastic, self-supporting high gloss polyester (PET) temporary casting sheet. In one embodiment, the carrier sheet can be a two mil thick biaxially oriented polyester film such as that sold under the designation Hostaphan 2000 polyester films by Hoechst Celanese Corp. The carrier sheet can be optionally release coated as described below.

The clear coat preferably comprises a solid polymeric material that can be extruded as a transparent film. The clear coat polymer is a solid polymer in the sense that it contains essentially no solvents that require high temperature exposure for drying or otherwise hardening the clear coat film. The resulting film is a melt cast film in the sense that it is produced by melting the extrudable polymeric starting material and coating it onto the casting sheet through the narrow extrusion die. The film is cast on the traveling carrier sheet at production speeds without added solvents to produce the film-forming material. This process results in a level of molecular orientation in the finished film.

The polymeric material can comprise various thermoplastic, thermoformable and weatherable polymers such as acrylics, urethanes, vinyls, fluoropolymers, and blends thereof. Polyvinylidene fluoride (PVDF) and polyvinyl fluoride (PVF) are preferred fluoropolymers. A presently preferred extrudable polymeric material comprises a blend or alloy of PVDF and acrylic resins. The preferred acrylic resin is polymethyl methacrylate (PMMA) or copolymers thereof, although polyethyl methacrylate (PEMA) also can be used. In a presently preferred formulation the clear coat material comprises from about 50 percent to about 70 percent PVDF and from about 30 percent to about 50 percent acrylic resin, by weight of the total solids present in the PVDF/acrylic formulation. These solids ranges are based on the relative proportions of the PVDF and acrylic components only in the clear coat formulation. Other minor amounts of solids such as UV stabilizers, pigments, and fillers also may be contained in the clear coat formulation.

The blended clear coat polymeric material is preformed as an extrudable dry particulate material in pellet form fed from a hopper 14 to an extruder having an extruder die 16 adjacent the surface of the carrier sheet. The carrier sheet is provided as a supply roll 18, is unwound, and travels at a high line speed past the extruder die opening. In one embodiment, line speed exceeds 200 feet per minute. The carrier wraps around a pressure roll 15 below the extruder die. The die extrudes the polymeric material vertically through a narrow slot to form a thin low viscosity coating of a melt of uniform thickness that uniformly coats the carrier sheet which is continuously moving at high speed past the extruder die slot. Extrusion temperature is in excess of 340° F., and in some instances can approach 450° F. The entire thickness of the coating for the pass under the extruder die is applied across the width of the carrier. The coated web passes through the nip of the pressure roll 15 and a chill roll 17 below the extruder. The nip pressure applied by the pressure roll provides smoothing of the exposed face of the coating. The extruded coating is immediately cooled by contact with the chill roll 17 which hardens the extruded clear coat layer. The extrusion coated carrier is wound as a take-up roll 20.

A pigmented color coat material 22 is solvent cast on the extruded clear coat side of the carrier 12. The color coat 22 can comprise various polymers used as binders for paint films such as thermoplastic, thermoformable and weatherable acrylics, urethanes, vinyls, fluoropolymers and blends thereof. The fluoropolymers preferably comprise PVDF or copolymers of PVDF resins. The preferred color coat formulation is a blend of copolymers of PVDF and an acrylic resin. Preferably, the acrylic component can comprise PMMA, although PEMA also can be used. In addition, reflective flakes can be uniformly dispersed in the color coat to produce automotive films having a metallic appearance. Formulations for solvent casting the color coat formulation are described for example in U.S. Pat. No. 5,707,697 to Spain et al. which is incorporated herein by this reference. Following solvent casting of the color coat on the clear coat, the color coat is dried at elevated temperatures to evaporate the solvents, and the paint coated carrier is then wound as a take-up roll 38.

An optional size or adhesive coat may be applied to the color coat side of the carrier sheet.

In another embodiment of the invention, the clear topcoat 10 can be extrusion coated in thin film form generally ranging from about 0.1 mil to 3.0 mils in thickness onto the surface of the carrier 12. Thicker top coats may be used for certain multi-layer films containing a base coat with reflective flakes. The carrier is preferably an oriented polyester casting film such as DuPont Mylar A or Hoechst Hostaphan 2000. The thickness of carrier sheet can be from 0.5 mil to 3.0 mils thick, but preferably 1.4 to 2.0 mils functions best for subsequent coating and lamination operations, that is, for web control and heat transfer properties.

In this embodiment, the carrier film is unwound, then passed to the extrusion coating die 16 where the clear topcoat 10 is extrusion coated onto the carrier sheet. The topcoat formulation is preferably an extrudable solventless polymeric material comprising a fluorocarbon/acrylic blend such as polyvinylidene fluoride, i.e., Kynar 720 (Elf Atochem), and polymethyl methacrylate, i.e., Plexiglas VS100 (Atohaas). The fluorocarbon polymer content in these blends ranges from about 55% to about 65% and the acrylic component ranges from about 35% to about 45%. Other fluorocarbons, other acrylics, and copolymers thereof may also be used as topcoats. The preferred fluoropolymeric resin is a homopolymer for providing good abrasion resistance. Certain PVDF copolymers can be used when more flexible films are desired. The preferred topcoat thickness ranges from about 0.5 to 2.0 mils in order to obtain the needed gloss, DOI, and abrasion, weathering, and impact resistance in the finished product. The resulting clear coat film is not a free film or a self-supporting film; it requires use of the carrier sheet 12 for support throughout the process.

Figure 2:
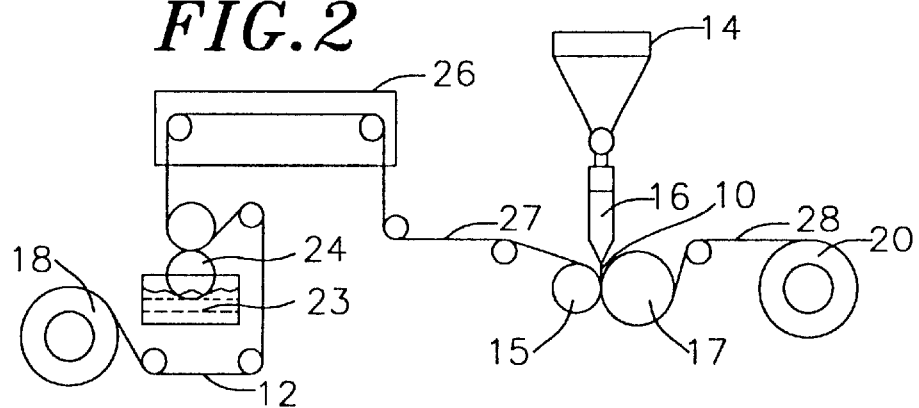
FIG. 2 is a schematic diagram illustrating a process of applying a release coat or gloss control coat to a carrier sheet and then extrusion coating a clear coat on the release-coated carrier sheet.
Figure 3:
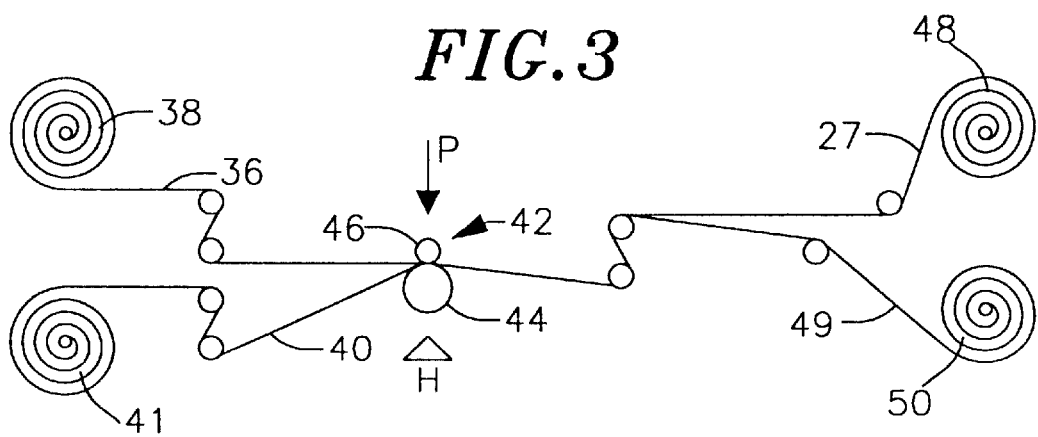
FIG. 3 is a schematic diagram illustrating a further step in the process in which the clear coat/color coat film is transfer-laminated to a thin semi-rigid backing sheet.
Figure 4:
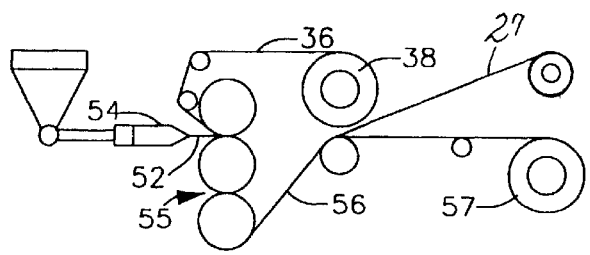
FIG. 4 is a schematic diagram illustrating an alternative subsequent step in the process in which a paint film is applied to a backing sheet while the sheet is being formed by the sheet extruder.
Figure 5:
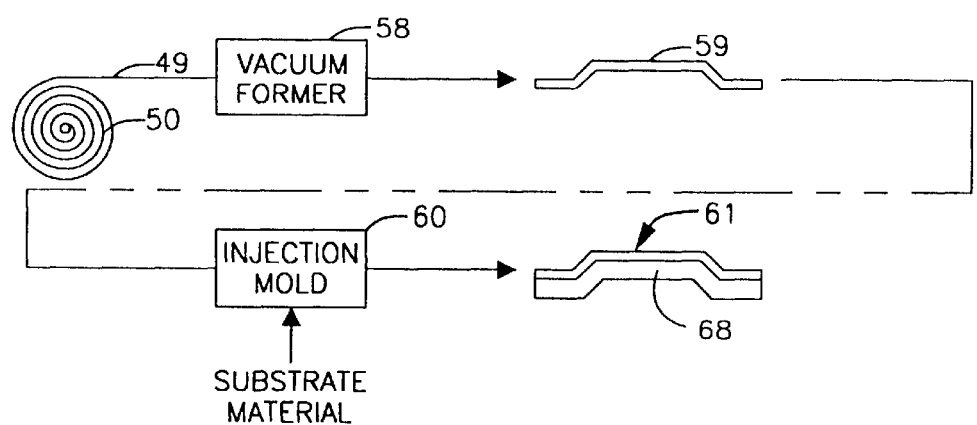
FIG. 5 is a schematic diagram illustrating final steps of the process in which the laminate produced by the steps shown in FIGS. 3 or 4 is vacuum-formed and then injection molded to produce a finished panel.

FIG. 2 is a schematic diagram illustrating in more detail the successive steps in an extrusion coating process illustrated generally in FIG. 1. FIGS. 3 through 5 are schematic diagrams illustrating successive steps in applying the extrusion coating process to production of an exterior automotive quality paint coat on a molded plastic car body panel. The extrusion coated clear coat/color coat film in this instance is bonded to a contoured surface of a molded plastic car body panel to form a high gloss/high DOI protective and decorative outer surface on the finished body panel. FIGS. 2 through 5 are to be understood as an example of one application of the extrusion coated films of this invention, inasmuch as other applications are also within the scope of the invention as it applies to protective and decorative surfacing films for substrate panels.

Referring to FIG. 2, the carrier 12 is first coated with an optional release coat which provides a means of controlling the gloss and DOI levels of the extruded clear coat. The supply roll 18 of the carrier film 12 is shown with the carrier sheet passing around a series of rolls prior to applying a release coat material 23 to the surface of the carrier by a conventional gravure cylinder 24. The release coated carrier then passes through an oven 26 for drying and crosslinking the release coat material. Application of the release coat is preferably controlled so that it produces a high gloss surface in its dry film form.

FIG. 2 schematically illustrates a two-step process which can be performed in tandem or as two individual operations: (1) gravure printing a polyester carrier film with a silicone release coat or a gloss control release coat, and (2) extrusion coating a clear topcoat on a silicone release coated or gloss control coated carrier from the first operation. The carrier film 12 travels into the gravure print station where the release coat or gloss control release coat is gravure coated onto carrier film. The carrier film coated with the silicone release coat or gloss control release coat is passed through a 20-ft. long drying oven 26 with impinging air for 325–350° F., sufficient for drying and crosslinking the silicone release coat or the gloss control release coat on the carrier film. In the first stage of the drying oven, the silicone release coat or the gloss control release coat is sufficiently crosslinked to permanently bond it to the carrier sheet. The silicone release coat dried deposition weight is from 0.5–1.0 gm/m$^2$ and the gloss control release coat dried deposition weight is from 3–5 gm/m$^2$. (As an alternative, the silicone coated PET can be purchased directly from the manufacturer, such as American Hoechst 1545.)

The release coated carrier 27 then exits the drying oven 26 and passes to the extrusion coating operation where the extruder die 16 extrusion coats the clear coat film 10 onto the release-coated surface of the carrier sheet. Immediately following the extrusion coating step the clear-coated film passes around the chill roll 17 where the extruded film undergoes controlled cooling. One or more water cooled chill rolls can be used for contacting the carrier sheet to produce controlled temperature reduction. The process by which the carrier is cooled also controls the exterior gloss and DOI of the finished product. The extrusion top coated and release coated carrier film 28 is then wound as the take-up roll 20.

The chill roll has sufficient capacity to rapidly cool and harden the clear coat layer prior to its exiting the chill roll. The extruded material is rapidly cooled from an extrusion temperature of greater than about 385° F. to approximately room temperature of about 70° F. to 80° F. (more preferably 72° F. to 75° F.) while in contact with the chill roll. The extruded clear coat is maintained in pressure contact with the chill roll from nip pressure applied by the pressure roll 15 during cooling. Cooling is done rapidly under conditions that avoid hazing of the PVDF/acrylic material and to ensure proper release from the chill roll. If cooling rate is too slow (or if the extruded coating is not sufficiently cool when exiting the chill roll), phase separation and resultant hazing can occur. Also, if the temperature is not reduced sufficiently, a release problem can be caused by the acrylic resin component being too tacky when released. Operating at a slow line speed can ensure proper cooling, but high line speeds are desirable and the capacity of the chill roll is sufficient to easily cool the clear coat (at a coat thickness from about 1 mil to 3 mils) to a hardened condition while operating at line speeds in excess of 150 to 160 feet per minute.

Generally speaking, a clear coat material having an extrusion temperature greater than 385° F. exposed to a chill roll temperature below 80° F. hardens the clear coat material within an elapsed time of less than about 3 seconds. Under these conditions cooling is sufficiently rapid that a 1 mil to 3 mils clear coat can be extruded and hardened at line speeds greater than 100 ft./min. More preferably, and in the examples to follow, clear coat layers can be extruded at a thickness of about 1 mil and cooled rapidly from extrusion temperatures of about 385° F. to 400° F. to about 70° F. to 75° F. for hardening the clear coat. Under these conditions chill roll temperature is maintained between about 60° F. to 85° F. and more preferably at temperatures between about 70° F. to 80° F.

As mentioned previously, cooling rapidly to approximately room temperature is sufficient to harden the clear coat layer and avoid hazing. Another approach that ensures avoiding phase separation and hazing of the clear coat layer is to rapidly cool the clear coat to a temperature below its glass transition temperature ($T_g$) while in contact with the chill roll. For blended clear coat materials having more than one $T_g$, cooling is done to below its lowest significant $T_g$. For clear coat layers comprising an alloy of PVDF/acrylic resins, the examples to follow show that cooling to below about 60° F. to 70° F. will be necessary to cool the material to below its glass transition temperature.

By following the previously described procedures, highly transparent clear coat layers can produce good release from the chill roll while operating at line speeds in excess of 160 ft./min. Line speeds greater than 300 ft./min. also can be achieved including line speeds approaching 380 ft./min.

Referring again to FIG. 1, the clear coat side of the carrier 28 is coated with a solvent cast color coat. The solvent cast color coat material 22 is applied by a reverse roll coating station 30, although the color coat film also can be applied by gravure printing or other solvent casting or coating techniques. The paint coated film 32 comprising the extruded clear coat and solvent cast color coat then passes to a drying oven 34. The color coat is preferably dried at oven temperatures from about 250° F. to 400° F. Preferably, drying is done in multiple stages as is known in the art. The solvent gases are driven off by the drying process, leaving a film 36 that exits the oven comprising a color coat in hardened form bonded to the extrusion coated clear coat on the release coated carrier sheet. The film 36 is then wound as the take-up roll 38.

In one embodiment a polyvinylidene fluoride/acrylic pigmented color coat is roll coated onto the extrusion top coated carrier at roll coating station 30. One preferred ratio of polyvinylidene fluoride copolymer to acrylic polymer is 75/25 by weight based on the total PVDF copolymer/acrylic polymer solids contained in the color coat formulation. Kynar 7201 (Elf Atochem) and Elvacite 2008 (I.C.I.) are preferably used in this application. The drying oven 34 has three drying zones set at 160°, 240° and 360° F. The color coat is dried and fused before leaving the drying oven.

The color coat side of the paint coat on the carrier may next be coated with a size coat such as a thermoplastic adhesive. A chlorinated polyolefin (CPO) adhesive is used as the tie coat for bonding to a substrate made of thermoplastic polyolefin. A CPO size coat formulation preferably includes Hypalon 827B from DuPont or 13LP from Hardlyn mixed with a solvent such as toluene in a ratio of about 25%/75%, by weight.

Referring to FIG. 3, the paint coated carrier 36 is next laminated to a thermoformable polymeric backing sheet by dry paint transfer-laminating techniques. The laminating step includes separating the carrier sheet from the clear coat layer and simultaneously bonding the clear coat and color coat to a semi-rigid backing sheet 40. The backing sheet 40 is initially wound as a supply roll 41 and is unwound and fed to a transfer-laminating station 42. The thickness of the backing sheet is preferably in a range from about 10 to about 40 mils with 20 mils being a preferred thickness of the backing sheet. The backing sheet can be made from various polymeric materials such as thermoplastic polyolefin, polyester, ABS, nylon, PVC, polycarbonate, polyarylate, or polyolefin such as polypropylene or polyethylene. The paint coated carrier and backing sheet pass between a heated laminating drum 44 and a pressure roll 46 for pressing the overlapping sheets into contact and for heating them at a temperature sufficient to activate the adhesive size coat, which may be coated on the dried color coat. Alternatively, the size coat may be coextruded with a backing sheet or laminated to the backing sheet prior to lamination of the clear coat and color coat to the backing sheet. Thus, the process of FIG. 3 transfers the paint coat (clear coat/color coat) to the surface of the semi-rigid thermoformable polymeric backing sheet.

Following the transfer-laminating step, the carrier sheet 27 is separated from the resulting laminate and wound on a re-wind roll 48, and the resulting laminate 49 (which comprises the thermoformable backing sheet with the adhered color coat and clear coat) is wound as a take-up roll 50. The exposed clear coat side of the resulting laminate 49 may be measured for DOI and gloss. The smooth surface of the release coated carrier sheet 27 is replicated on the smooth surface of the laminate, which transfers a high gloss and a high DOI appearance to the clear coat side of the laminate. A high DOI greater than 60 and a 20° gloss greater than 75 are achieved with this invention. The techniques for measuring these paint film properties are described below.

FIG. 4 illustrates an alternative process of transferring the clear coat/color coat paint film to a thermoformable backing sheet. In this embodiment the backing sheet 52 is continuously extruded from an extruder die 54 while the paint film 36 supported by the carrier is unwound from the roll 38 and continuously extrusion laminated to the backing sheet as the backing sheet is being formed by the sheet extruder. The backing sheet may be made from any extrudable polymeric material selected from the group of backing sheet materials described previously. The resulting laminate (comprising the carrier-supported clear coat/color coat films laminated to the extruded sheet 52) passes to a calendar/chill roll stack 55 for hardening the backing sheet and bonding the clear coat/color coat film to it. The finished paint film laminate 56 is wound as a take-up roll 57 after the release coated carrier sheet 27 is removed.

Referring to FIG. 5, the paint coated backing sheet 49 (from the FIG. 3 process) or 56 (from the FIG. 4 process) then passes to a thermoforming step where the sheet is thermoformed into a desired contoured three-dimensional shape. The thermoforming operation generally includes placing the paint coated backing sheet in a vacuum forming machine 58, and heating it to a temperature in the range of about 270° F. to 540° F. The paint-coated side of the backing sheet is exposed during the thermoforming operation. After the laminate is heated to the desired temperature, the laminate is vacuum formed into the desired three-dimensional shape by drawing a vacuum on a vacuum forming buck to force the softened plastic into the shape of the working surface of the buck. Pressure also may be used to force the sheet around the tool. The buck stays in place long enough to cool the plastic to a solid state, after which the laminate is removed from its surface to form the resulting three-dimensionally contoured shape of the paint coated laminate 59. In one embodiment, the paint coat can elongate from about 40 percent to about 150 percent greater than its unextended state during the thermoforming step without deglossing, cracking, stress whitening, or otherwise disrupting the necessary levels of exterior automotive durability and appearance properties of gloss and distinctness-of-image. In one embodiment the measured DOI of the thermoformed sheet following such elongation is in excess of 60 (as measured on the HunterLab Dorigon D-74R-6 instrument). 20° gloss measures at least 60 and 60° gloss measures at least 75 under such elongation. In some instances involving thermoforming with little or no shaping (and therefore little or no elongation), finished products are made with higher levels of gloss and DOI.

Following the thermoforming step and die cutting step, the resulting paint coated thermoformed shell 59 is then placed in an injection mold 60 having a contoured mold face that matches the contoured outer surface of the clear coat side of the thermoformed shell 59. A polymeric injection molding material is injected into the mold and forced against the backing sheet side of the thermoformed sheet to bond the substrate material to the thermoform. The resulting panel 61 is then removed from the mold to provide a rigid substrate panel with a contoured decorative outer surface comprising the thermoformed backing sheet and its adhered clear coat, color coat, size coat and tie coat, if required. The preferred polymers used for the substrate plastic molding material of the finished panel are polymers compatible with the material from which the backing sheet is made. These may include thermoplastic olefins, ABS, nylon, polyester, polyolefins such as polypropylene and polyethylene, polycarbonates, and polyvinylchloride.

The transfer-lamination, thermoforming, and injection molding steps of the insert-mold process can be carried out by various processing steps known to those skilled in the art and are described, for example, in U.S. Pat. No. 5,707,697 to Spain et al. and U.S. Pat. No. 4,902,557 to Rohrbacher which are incorporated herein by reference.

Figure 6:
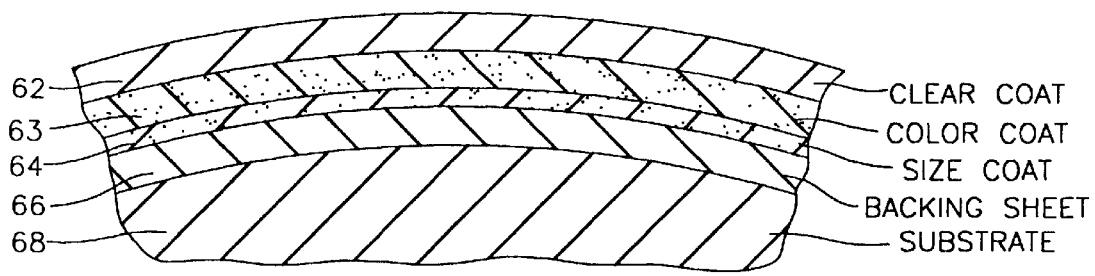
FIG. 6 is a schematic cross-sectional view illustrating multiple layers of the finished paint coated panel of FIG. 5.

FIG. 6 illustrates a cross-sectional view of the finished body panel which includes a contoured outer surface formed by a clear coat 62 that has been extrusion coated and bonded to an underlying color coat 63, a size coat 64 which bonds the color coat side of the clear coat/color coat composite to a thermoformable backing sheet 66, and an underlying rigid molded polymeric substrate panel 68. The contoured decorative outer surface of the clear coat/color coat paint film provides a high gloss, high DOI outer surface in which the color coat is visible through the transparent outer clear coat.

Many of the constructions described above with backing sheets less than 20 mils in thickness can be placed directly into an injection mold without the intervening thermoforming step. The plastic molding material is then injected into the mold and shapes the laminate to the contoured surface of the mold cavity, while the plastic molding material forms the substrate panel of the finished decorated part. Many clear coat, color coat, and size coat foils may be made by this in-mold process to form the finished part, or this construction may be first laminated to a 3–15 mil thick flexible backing sheet, such as vinyl, ABS, nylon, polyolefin or urethane, the carrier removed, and the laminate then formed in the injection molding machine to produce a finished part. These in-mold techniques have been used previously in the industry for interior automotive films.

The invention also can be used to produce constructions with a modified insert-mold process in which the preformed backing sheet laminate with the clear coat/color coat/size coat combination is initially placed in a mold and the laminate is pre-shaped in the mold to a finished three-dimensional contour, prior to injection molding and bonding the substrate molding material to the shaped laminate.

There are alternative extrusion coating techniques (not shown) for applying the clear coat, color coat and size coat layers to the carrier sheet. For instance, the clear coat and color coat can be extruded in series through separate extruder dies; or the clear coat and color coat can be coextruded through a single die onto the traveling carrier sheet; or the clear coat, color coat and size coat can be coextruded as a multi-layer film onto the carrier, followed by laminating each film to the backing sheet. In a further alternative embodiment a gloss control coating can be applied to the carrier by a solvent casting process followed by an extrusion coated clear coat which is then printed with solvent-based gravure patterns and then coated with a color coat and size coat, both of which optionally may be coextruded. Such gloss control can be used for making low gloss or semi-gloss finishes on various products including interior automotive parts. These extrusion processes are described in more detail in application Ser. No. 08/793,836, which is incorporated herein by reference.

Figure 7:
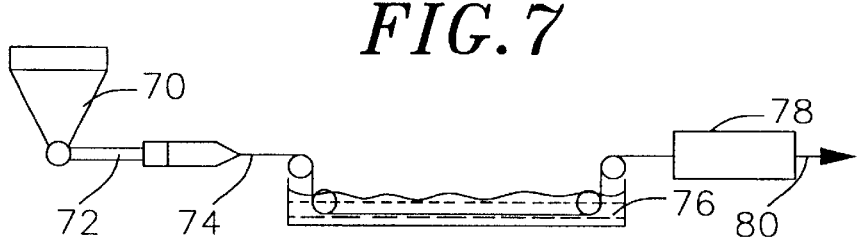
FIG. 7 is a schematic diagram illustrating an embodiment of the invention in which resins and additives are compounded by melt blending in an extruder to produce homogeneous pellets for use in the extrusion coating process.

Referring to FIG. 7, the clear coat, color coat or size coat materials referred to previously can be initially made in pelletized form. A dried blended formulation is fed to an extrusion hopper 70 and is then extruded through a twin screw compounding extruder 72 to form multiple extruded strands 74 which pass to a cooling bath 76. This hardens the extrusion which then passes to a chopper 78 that produces the finished pellets at 80.

Figure 8:
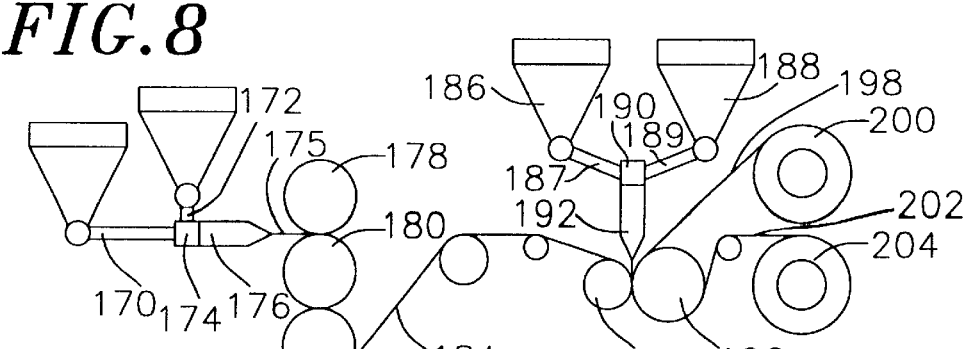
FIG. 8 is a schematic diagram illustrating an embodiment in which a coextruded substrate is formed, followed by a coextruded color coat and clear coat to which a carrier sheet is applied at the extrusion coating/laminating station.

FIG. 8 schematically illustrates a process in which an exterior automotive laminate is produced in-line using thick sheet extrusion and extrusion coating processes. A thick sheet coextrusion line has two extruders. A first extruder 170 is fed with an extrudable material of dried pellets or dried flowable powders comprising ABS, polyolefins, polycarbonate or other extrudable thermoplastic materials suitable as a flexible laminate backing sheet. A second extruder 172 is fed with an extrudable material of dried pellets or dried flowable powders such as acrylics, CPO, urethanes and other material for use as a size coat for exterior laminate foils. A melt stream from the two extruders is fed to a feed block 174. The partitioned melt 175 is then extruded through a die 176 to a calendar stack consisting of three temperature controlled rolls 178, 180 and 182. The coextruded sheet 175 is fed horizontally into a set opening between the top roll 178 and middle roll 180 of the three roll calendar stack. The top roll is used to meter and the middle roll is set at line speed to support the substrate while it starts to solidify. The bottom roll 182 is used to smooth the exposed surface of the size coat and to finish cooling the substrate for proper handling. The cooled primed sheet 184 passes over idler rolls to an extrusion coating station having two extruders where a color coat and a clear topcoat are coextruded onto the primed sheet. The color coat material is fed from a hopper 186 to a first extruder 187 and the clear coat material is fed from a hopper 188 to a second extruder 189. The first extruder 187 uses compounded pigmented PVDF copolymer/acrylic color coat as its feedstock. The second extruder 189 uses PVDF/acrylic clear topcoat as its feedstock. The melt stream from two extruders is fed to a feed block 190 which determines the relative thickness of each component in the final coextruded film. The partitioned melt flows from the feed block to an extrusion die 192. The partitioned melt is fed into the extrusion coater nip comprising a high durometer backup roll 194 and a chill roll 196. The primed backing sheet enters the extrusion coating nip and a high gloss polyester carrier film 198 is fed over the chill roll 196 from a supply roll 200. This polyester film is used to enhance the gloss of the final product, since the topcoat of the coextruded film replicates the smooth surface of the polyester web. The composite structure (backing sheet, size coat/color coat/clear coat/ carrier film) passes through the nip and is wrapped around the chill roll. The laminate 202 then travels over idler rolls to a take-up roll 204.

As an alternative to the process of FIG. 8, the primed backing sheet 184 can be laminated to a paint film similar to that produced by the process of FIGS. 1 to 3, in which the outer clear coat is formed by extrusion coating on a high gloss carrier, and the color coat is solvent cast on the clear coat and dried to form the paint film laminate. The resulting paint film laminate is then laminated to the size coat side of the primed backing sheet.

Figure 9:
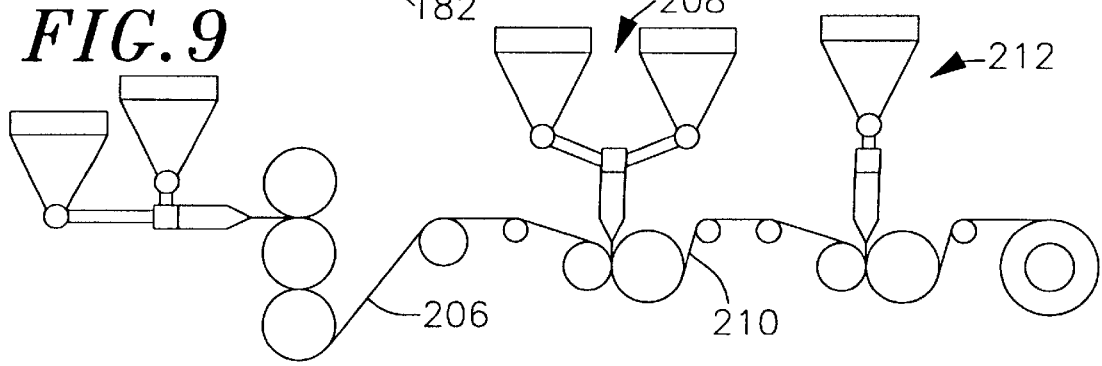
FIG. 9 is a schematic diagram illustrating an embodiment in which a sheet containing a substrate, size coat, color coat and clear coat as shown in FIG. 8 is formed and extrusion coated with a carrier sheet rather than applying it at a laminating station.

FIG. 9 schematically illustrates an embodiment similar to FIG. 8 in which an exterior laminate with a thermoformable protective sheet is produced in-line using a flat sheet extrusion line and two extrusion coating stations. A flat sheet extrusion line as described in FIG. 8 coextrudes a primed backing sheet 206. This primed backing sheet passes over idler rolls into a nip of extrusion coating station 208 where a color coat and a clear topcoat are coextruded onto the primed surface of the backing sheet. The clear coat/color coat are passed around a chill roll to produce an exterior laminate 210. The resulting laminate passes over idler rolls into the nip of a second extrusion coating station 212 where a thermoformable protective coat is extruded onto the top coated surface of the laminate. Thermoformable materials such as ethylene-acrylic acid, polypropylene nylon, surlyn, vinyl urethane or nylon modified urethane can be extrusion coated as the protective coat. The exterior laminate with a thermoformable protective coat can be thermoformed, die cut, and injection clad to produce a finished part with a temporary protective coat which protects these parts in shipping, assembly and painting. The protective coat is stripped off after these operations to yield a finished part. The protective coat also can be used as a paint mask.

The process of FIG. 9 alternatively can be carried out by solvent casting the color coat on the extruded clear coat, in a manner similar to the steps of FIGS. 1 to 3, instead of coextruding the color coat and clear coat.

FIGS. 10 and 11 illustrate an in-mold process which is an alternative to the insert-mold process described previously. According to one embodiment of the in-mold process, a finished exterior automotive part can be produced using exterior in-mold foils or in-mold laminates as produced by conventional solvent casting and by extrusion coating processes or a combination thereof. For shallow draw parts (0.125"–0.25") with gentle draw and radius corners, an in-mold foil can be used to form an exterior decorated automotive part. This in-mold foil 214 as illustrated in FIG. 10 is placed in a mold cavity 216 of an injection molding machine with a PET carrier film 218 facing the cavity side of the mold. The mold is closed, sandwiching the foil between sides of the molding cavity. Molten plastic 220 is injected into the mold cavity against the size coated face 222 of the foil, forcing the in-mold foil to conform to the shape of the cavity. The size coat bonds the foil to the injection molding plastic which forms a substrate panel 223. The molded part 224 is shown in FIG. 11. The mold is then opened and the carrier sheet and any fringe resulting from the in-mold process are removed to yield a decorated exterior body part 226.

For deeper draw in-mold parts, an in-mold laminate may be used in the process illustrated in FIGS. 10 and 11 to produce a decorative exterior body part. Such an in-mold laminate can be produced by first laminating an in-mold foil to a flexible backing sheet, such as a flexible vinyl, urethane, ABS, polyolefin or nylon sheet described previously. This in-mold laminate is placed in the mold cavity of an injection molding machine, and after the mold is closed, preheating the laminate, or blowing or vacuum forming the laminate into the mold cavity prior to injection cladding can improve the appearance of the finished part. Molten plastic is injected against the backing sheet, forcing the in-mold laminate to conform to the shape of the mold cavity.

FIG. 12 shows a further embodiment of the invention comprising a three-layer coextrusion which includes a clear coat, a color coat and a size coat extruded at 230. The clear coat, color coat and size coat, in that order, are joined together in a die block 232 with a backing sheet from an extruder 234. The backing sheet provides a support for the three layer coextruded films. The polymeric material that comprises the support layer of the coextrusion can be any extrudable material such as ABS, thermoplastic polyolefin, polycarbonate, polypropylene or PETG. The resulting four-layer coextrusion 236 is then extrusion coated onto the surface of a PET carrier sheet 238 that travels past the extruder die opening. The carrier 238 can comprise various polymeric materials such as PET or PETG. In one process, a clear coat, color coat, and size coat are extrusion coated from a single extrusion coating station using three separate extruders as illustrated in FIG. 12. One extruder contains a PVDF/acrylic clear topcoat as described previously. The second extruder is fed pigmented PVDF copolymer/acrylic color coat as described previously. The third extruder is fed an acrylic size coat material such as Plexiglas VS100 (Atohaas) or CPO. The melt streams from these three extruders are fed to the feed block 232 which controls the relative thickness of each component in the final coextruded film. A 45/45/10 ratio of clear coat/color coat/size coat is preferred. Backing sheet thickness is about 20 times the clear coat and color coat. The partitioned melt 236 flows from the block to the extruder die. The partitioned melt is then extruded onto the polyester carrier sheet. The carrier sheet can be extruded simultaneously with coating of the extruded films onto the carrier, as in FIG. 12, or the three-layer extruded film can be coated onto a carrier sheet being unwound from a supply roll. This coated foil then travels over a chill roll and idler rolls to a take-up roll 240. Alternatively, this foil can be laminated to unprimed ABS instead of primed ABS to yield a laminate which can be thermoformed, die cut, and injection clad to yield a finished automotive part.

Another embodiment of this invention is an extruded color coat that can be used without a clear coat. The extruded color coat which comprises the exterior weatherable layer of the finished product can be made from various thermoplastic and thermoformable polymers such as acrylics, urethanes, vinyls, fluoropolymers, and blends thereof. A presently preferred extrudable polymeric color coat material comprises a blend of polyvinylidene fluoride (PVDF) and acrylic resins. The preferred acrylic resin is a polymethyl methacrylate polymer (PMMA), although a polyethyl methacrylate polymer (PEMA) also can be used. In a preferred formulation the polyvinylidene difluoride Kynar 720 (Elf Atochem) comprises 55 percent of the formulation. VS100 acrylic polymer (Atohaas) comprises 23 percent, Tinuvin 234 UV Absorber (Ciba-Geigy) comprises 2 percent, and titanium dioxide and mixed metal oxide pigments comprise 20 percent.

A concentrate of UV absorber and acrylic resin can be compounded and added to the PVDF/acrylic pellets at the extruder when extrusion coating. Such concentrates also can include pigments and other additives combined with the pellets in the extruder. For instance, the mixed metal pigments and titanium dioxide pigment are typically predispersed in the acrylic resin (VS100) in pellet form. The individual pigment pellets can be combined with the Kynar 720 resin, VS100 acrylic resin and Tinuvin 234, dry blended, and then compounded in a twin screw extruder. Press outs of the colored pellets can be used to check color.

Other embodiments illustrating various combinations of extrusion coating and coextrusion of multiple layers in the laminates of this invention are described in application Ser. No. 08/793,836. These include extrusion coating a clear coat and a color coat onto a common carrier sheet in series; or coextruding them onto a common carrier sheet; or extrusion coating the clear coat layer followed by coextruding a color coat and size coat.

EXAMPLE 1

The following formulation of an extrudable clear coat polymeric material was pelletized, and the pellets were fed to an extruder for extrusion coating the resulting clear coat onto the surface of a carrier sheet traveling past the extruder die slot.

|   | INGREDIENTS | PARTS* |
|---|---|---|
| 1 | Kynar 720<br>Polyvinylidene fluoride (PVDE)<br>Atochem North America, Inc. | 65.00 |
| 2 | Elvacite 2042<br>Polyethyl methacrylate (PEMA)<br>E. I. DuPont (sold to ICI) | 35.0 |
| 3 | Tinuvin 234<br>UV stabilizer<br>Hydroxyphenylbenzotriazole<br>Ciba-Geigy | 2.0 |

*In this and other examples, "Parts" identified for each component are on a parts per weight basis.

Kynar 720 is the extrusion grade PVDF homopolymer corresponding to Kynar 301F that is commonly used in a solvent cast PVDF/acrylic formulation. Kynar 720 has a melting temperature of about 167° C., a Tg of about −38 to −41° C., and a melt viscosity at 215° C. (measured in Pas·sec at shear rates of 100,500 and 1,000 sec$^{-1}$) of 1,153, 470 and 312, respectively. (Melt viscosity in the examples herein is measured at an extrusion device temperature of 215° C. (355° F.) when operated at shear rates of 100, 500 and 1,000 sec$^{-1}$.) Elvacite 2042 is a polyethyl methacrylate (PEMA) which is compatible with PVDF and is the same acrylic used in the standard solvent cast Avloy® clear coat; this formulation was selected to simulate the formulation of the standard Avloy® clear coat. (Avloy is a trademark of Avery Dennison Corporation, the assignee of this application.)

This formulation was compounded twice through a 3.25" Davis Standard single screw extruder to obtain uniform blended pellets; however a twin screw is used for pelletizing in later examples for better distributive mixing. The two resins were dried at 130° F. for four hours before being extruded into pellets, and during the extrusion process a vacuum vent in the compression zone of the screw was used to further remove moisture and other volatile components. The feed into the extruder was starved, and the heating elements or zones of the extruder were set at (1) 420° F., (2) 430° F., (3) 430° F., (4) 430° F., (5) 430° F., (6) 430° F. adapter, (7) 430° F. die, but the observed values were (1) 416° F., (2) 418° F., (3) 427° F., (4) 423° F., (5) 428° F., (6) 424° F. adapter, (7) 429° F. die. The screw was maintained at 70 rpm using 34 amps and a screen pack consisting of two 20-mesh screens in series was used to clean up the melt stream. This material was pelletized with a 9–10 ft. water bath for a nine-second immersion to cool the extrudate prior to pelletization. Press outs were used to judge the homogeneity of the pellets.

This material was extrusion coated onto a two mil high gloss polyester film from American Hoechst designated Grade 2000. (The extruded material had a melt viscosity (Pas·sec) at 100, 500 and 1,000 sec$^{-1}$ of about 752–769, 303–308, and 200, respectively.) The polyester carrier provides a smooth glossy surface upon which the hot extrudate can form a thin clear film ranging from about 0.1 mil to about 2–3 mils thick. The thickness of the resulting films can be adjusted by the extrusion coating line speed and the screw speed of the extruder. Faster line speeds result in a thinner film, and faster screw speeds result in thicker films. The polyester carrier also acts as a support sheet for the thin clear film in subsequent operations such as coating and laminations. In this example a 2.5-inch extruder was used to extrusion coat a one mil thick PVDF/acrylic clear topcoat onto the polyester carrier. The compounded pellets were dried in a desiccant dryer at 130° F. for two hours prior to being fed into the extruder. The extruder had five heating zones which were set at (1) 390° F., (2) 400° F., (3) 410° F., (4) 420° F., (5) 420° F. The screw speed was held at 60 rpm. The matte chill roll was maintained at 75° F. for the entire run. (In the examples herein, the chill roll for rapidly cooling and hardening the extruded coating has a diameter of 24 inches.) A nip pressure of 20 pli and no corona treatment were used to enhance the bond between the film and the polyester carrier. At these settings a nominal one mil thick clear film was produced with a corresponding weight of 38 gm/m$^2$. This extrusion coating produced a roll composed of two mil gloss PET with a one mil clear topcoat. The extruded topcoat, however, bound to the PET carrier and would not release from the carrier.

Using the same extrusion coating conditions as above two more rolls were produced using Hostaphan 1545 silicone coated polyester as the carrier. While extruding the clear coat formulation onto the siliconized PET carrier, the extruded clear film wrapped around the chill roll due to a weak bond between the extruded film and the siliconized polyester. This problem was resolved by exchanging the gloss chill roll for a matte chill roll, which has a more facile release of the extruded film. The reverse side of the clear coat was embossed by the matte finish from the matte chill roll. When this roll was coated with a standard solvent based Avloy® white color coat, this coated film was dried and was then laminated (rubber roll at 400° F., 10 ft/min) onto a primed 19 mil thick gray ABS sheet. When the carrier was removed, the laminated sample showed no texture from the matte chill roll. When this sample was thermoformed (19 seconds, 330° F. surface temperature), texture from the matte roll surface was evident. The release of the extruded film from the siliconized PET was weak, having a peel strength of 10 gm/in. Similar results were obtained when this clear coat formulation was extrusion coated onto siliconized release paper, but the extruded film replicated the texture of the paper stock.

A roll using the same conditions described above with polypropylene film as a carrier was extrusion-coated under the same conditions. The polypropylene carrier distorts when the hot extrudate touches its surface, causing wrinkles in the finished film; however, the extruded clear coat releases easily from the polypropylene carrier. In a later trial when polypropylene coated paper was used as the carrier, the hot extrudate did not distort or wrinkle the polypropylene coated paper due to the support afforded by the paper stock. The clear topcoat released easily from this carrier but it revealed texture transferred from the paper stock.

EXAMPLE 2

A comparative evaluation was made between the formulation described in Example 1 and the following formulation:

| | INGREDIENTS | PARTS |
|---|---|---|
| 1 | Kynar 720<br>Polyvinylidene fluoride (PVDE)<br>Elf Atochem North America | 70.0 |
| 2 | VS100<br>Polymethyl methacrylate (PMMA)<br>Atohaas | 30.0 |
| 3 | Cyasorb P 2098<br>UV stabilizer<br>2 hydroxy-4-acrylooxyethoxybenzophenone<br>Cytec | 2.0<br>(pph) |

The VS100 is a polymethyl methacrylate (PMMA), known as Plexiglas, which is compatible with PVDF and has a temperature/viscosity profile closely matching the Kynar 720. This formulation was selected for superior extrusion melt strength. The VS100 has a Tg of about 98–99° C., and a melt viscosity (measured in Pas·sec) at 100, 500 and 1,000 sec$^{-1}$ of 940, 421 and 270, respectively. The formulation of Example 1 wrapped around the gloss chill roll during the extrusion coating process. To prevent this failure a new formulation was developed which would not bind to the siliconized PET and would release easily from a gloss chill roll. The tackiness of this formulation was reduced by increasing the Kynar 720 level and by increasing Tg of the acrylic component; the Tg of Elvacite acrylic 2042 and VS100 acrylic is 65° C. and 100° C., respectively. The Kynar/acrylic ratio was changed from 65/35 to 70/30. This formulation easily released from a siliconized polyester web and a high gloss chill roll, and during a later trial it released from a standard polyester web.

This formulation was compounded using a twin screw extruder manufactured by Werner Pfleiderer, model 53MM, to obtain uniform blended pellets. The twin screws were co-rotating and its configuration was designated Avery Dennison "A." The two resins were dried in a dryer at 160° F. for four hours before being extruded into pellets, and during the extrusion process a vacuum vent in the compression zone of the screw was used to further remove moisture and other volatile components. The feed into the extruder was starved, and the heating elements or zones of the extruder were set at: (1) 100° F., (2) 360° F., (3) 360° F., (4) 360° F., (5) 360° F., (6) 360° F., (7) 360° F., but the observed values were (1) 108° F., (2) 360° F., (3) 374° F., (4) 366° F., (5) 360° F., (6) 355° F., (7) 358° F. The screw was maintained at 66 rpm. The melt temperature of this formulation was maintained at 215° C. (355° F.) and a screen pack consisting of three different wire meshes: 20, 40, 60, was used to clean the melt stream. This material was pelletized.

The pellets were extrusion coated on a 1.42 mil high gloss silicone coated PET designated Hostaphan 1545. (The extruded material had a melt viscosity (Pas·sec) at 100, 500 and 1,000 sec$^{-1}$ of about 803–829, 373–376 and 248–250, respectively.) The polyester carrier provides a smooth glossy surface upon which the hot extrudate can form a thin clear film ranging from about 0.1 mil to about 2–3 mils thick. The thickness of the resulting clear films are adjustable by the extrusion coating line speed and the screw speed of the extruder, as described previously. In this example a 6.0 inch extruder with a single flight screw was used to extrusion coat a one mil thick PVDF/acrylic clear topcoat onto the polyester carrier. The compounded pellets were dried at 130° F. for two hours prior to being fed into the extruder. The extruder had eleven heating zones set at: (1) 380° F., (2) 370° F., (3) 340° F., (4) 340° F., (5) 340° F., (6) 340° F., (7) flange 340° F., (8) adapter 1 (340° F.), (8) adapter 2 (340° F.), (9) pipe 350° F., (10) end cap 100° F., and (11) die 350–365° F.; the die was a T-slot and had five zones: (1) 365°, (2) 360°, (3) 350°, (4) 360°, and (5) 365°. The die temperature profile was used to maintain uniform melt flow across the die. The screw speed was held at 15 rpm and line speed was 170 ft/min. The high gloss chill roll was maintained at 60° F. for the entire run. A harder durometer and smaller diameter nip roll produced the highest nip pressure and the highest gloss finished film. A 200 mesh welded screen pack was used to clean the melt stream. At these settings a clear one mil thick film was produced with a corresponding weight of 38 gm/m$^2$. The finished film was a high gloss film. No corona treatment was used.

Two rolls were produced in the above extrusion coating run; a first roll had a coating thickness of one mil, and a second roll had a thickness of 0.6–0.7 mil. The material was subsequently coated with a solvent based color coat as in FIG. 1 using a white lacquer comprising 53.6 parts clear vehicle, 12.5 parts cyclohexanone solvent, 33.4 parts exterior white pigment and trace amounts of iron yellow, carbon black and iron red pigments. The oven zones were set at 160°, 240°, and 350° F. The line speed was held at 25 ft/min. The applicator roll was held at 35 ft/min, and the metering roll was held at 7 ft/min. Under these conditions 45 gm/m$^2$ of dried color coat were deposited onto the one mil PVDF/acrylic topcoat.

The finished laminate had the following construction: 1.42 mil gloss PET, a nominal one mil clear PVDF/acrylic topcoat, and a 1.0 mil color coat. This construction was laminated to a primed 20 mil gray ABS backing sheet as shown in FIG. 3.

A size coated ABS sheet can be made by coating the size coat formulation (described below) on a polyester carrier as shown in FIG. 2 and then transfer laminating the material to an ABS sheet as shown in FIG. 3. For test purposes, Hoechst Celanese 2000, a two mil gloss PET film, was coated by a reverse roll coater with 6–7 gm/m$^2$ acrylic size coat. This material is laminated as shown in FIG. 3 to an extruded sheet of General Electric Cycolac LS, a 19 mil thick gray ABS sheet. During lamination, the acrylic size coat is transferred to the ABS backing sheet. The size coat formulation is:

| | SIZE COAT FORMULATION | |
|---|---|---|
| | INGREDIENTS | PARTS |
| 1 | Xylene | 61.0 |
| 2 | Acrylic resin | 29.0 |
| 3 | MEK | 10.0 |

The acrylic resin was Elvacite 2009 from ICI Acrylics, Inc., Wilmington, Del. The finished laminate was thermoformed and injection molded as illustrated in FIG. 5. Some phase separation was noted after thermoforming, resulting in drop of gloss and DOI for the clear coat/color coat. The foil can be used as an in-mold foil, without vacuum forming, for shallow draw parts.

EXAMPLE 3

The following formulation did not exhibit the phase separation problem noted in Example 2. An extrudable clear coat polymeric material was pelletized, and the pellets were fed to an extruder for extrusion coating the resulting clear coat onto the surface of a carrier sheet traveling past the extruder die slot.

| | INGREDIENTS | PARTS |
|---|---|---|
| 1 | Kynar 720<br>Polyvinylidene fluoride (PVDE)<br>Elf Atochem North America | 60.0 |
| 2 | VS100<br>Polymethyl methacrylate (PMMA)<br>Atohaas | 40.0 |
| 3 | Tinuvin 234<br>UV stabilizer<br>Hydroxyphenylbenzotriazole<br>Ciba-Geigy | 2.0<br>(pph) |

This formulation was selected for superior extrusion melt strength and to reduce phase separation of the Kynar 720 resin. The formulation was compounded using a twin screw extruder (Werner Pfleiderer, model 53MM) to obtain uniformly blended pellets. Extrusion was similar to that described in Example 2, except that the two resins were dried in a dryer at −40° dew pt. and 130° F. for four hours before being extruded into pellets. The screw was maintained at 63 rpm using 600–660 H.P. and a corresponding current of 54–58 amps. The melt temperature of this formulation was maintained at 215° C. (356° F.) and screen pack consisting of three different wire mesh: 20, 40, 60, was used to clean up the melt stream.

This material was pelletized and extrusion coated onto a two mil high gloss polyester film, American Hoechst 2000, to form a thin clear film ranging from about 0.1 mil to about 2–3 mils thick. (The extruded material had a melt viscosity (Pas·sec) at 100, 500 and 1,000 $sec^{-1}$ of about 752, 366 and 242, respectively; a melting temperature of about 162° C., and a Tg of about 32.6° C.) The polyester carrier was used as a support for the thin clear film in subsequent operations such as coating and laminations. In this example a 2.5 inch extruder was used to extrusion coat a one mil PVDF/acrylic clear topcoat onto a two mil gloss polyester carrier. The compounded pellets were dried at 130° F. for two hours prior to being fed into the extruder. The extruder had five heating zones which were set at (1) 390° F., (2) 400° F., (3) 410° F., (4) 420° F., (5) 420° F., and the screw speed was held at 60 rpm with a corresponding line setting of 3.47 ft/min. The high gloss chill roll was maintained at 60° F. for the entire run. At these settings a clear one mil thick film was produced with a corresponding weight of 38 $gm/m^2$. No corona treatment was used. However, when a corona treatment was used on the polyester web prior to reaching the extrusion coating nip, half moon defects were noted in the one mil thick clear film. The electrical charge left on the polyester web from the corona treatment did not dissipate before reaching the extrusion coating nip, distorting the clear film and resulting in half moon shaped defects.

The film was subsequently coated with a solvent based color coat as in FIG. 2. This roll was reverse roll coated using a red color coat (see formulation below). During this run, the ambient temperature was 76° F., and the relative humidity was 25%. Line speed was held at 15 ft/min. The first oven zone was set at 240° F. and the second oven zone was set at 250° F. The applicator roll ratio was held at 115% of line speed, and the metering roll was held at 20% of line speed. Under these conditions 25 $gm/m^2$ of dried color coat were deposited onto the one mil PVDF/acrylic topcoat.

| RED AVLOY ® COLOR COAT | | |
|---|---|---|
| | INGREDIENTS | PARTS |
| 1 | Clear vehicle for Avloy ® color coat | 74.32 |
| 2 | DPP Red BO 460-36351 | 11.26 |
| 3 | Magenta D-60 dispersions | 7.47 |
| 4 | 93 exterior white | 0.07 |
| 5 | D-60 violet dispersions | 1.88 |
| 6 | Methyl propyl ketone | 2.50 |
| 7 | Cyclohexanone | 2.50 |

This construction had the following structure: two mil gloss PET, one mil clear PVDF/acrylic topcoat, and 0.6 mil color coat. This construction was laminated to a primed 20 mil gray ABS backing sheet (L1826) as shown in FIG. 3. The material was thermoformed and injection molded (see FIG. 5).

Measurements of these base coat/clear coat samples revealed that the critical areas of the finished parts had 20° gloss readings in excess of 75 and DOI readings greater than 60 for metallic automotive paints as well as solid colors. (DOI is measured on the HunterLab Dorigon D47R-6 instrument.) The foil can also be placed in the injection mold without thermoforming and in-mold formed for shallow draw parts as described earlier. For deep draw parts the foil is first laminated to a flexible thermoplastic backing sheet, i.e. vinyl, urethane, or nylon. This flexible backing sheet aids in the distensibility of these foils. Such lamination (see FIG. 3) is performed under the lamination conditions described in Example 2. These laminates can also be injection molded without thermoforming by preheating the laminate and using pressure or vacuum to cause the material to take the shape of the mold face prior to injection of the molten plastic.

EXAMPLE 4

The following formulation of an extrudable clear coat polymeric material was pelletized, and the pellets were fed to an extruder for extrusion coating the resulting clear coat onto a carrier sheet traveling past the extruder die slot.

| | INGREDIENTS | PARTS |
|---|---|---|
| 1 | Kynar 720<br>Polyvinylidene fluoride (PVDE)<br>Elf Atochem North America | 65.0 |
| 2 | VS100<br>Polymethyl methacrylate (PMMA)<br>Atohaas | 35.0 |
| 3 | Tinuvin 234<br>UV stabilizer<br>Hydroxyphenylbenzotriazole<br>Ciba-Geigy | 2.0 |

This formulation was compounded using the twin screw extruder described in Examples 2 and 3 to obtain uniformly blended pellets. Extrusion was similar to that described in Example 2, except that the two resins were dried at 130–150° F. for 2–3 hours before being extruded into pellets, and the heating elements or zones of extruder were observed at (1) 101° F., (2) 358° F., (3) 339° F., (4) 359° F., (5) 359° F., (6) 361° F., and (7) 357° F. The screw was maintained at 63 rpm using 700 H.P. and a corresponding current of 68–78 amps. Melt temperature was maintained at 355° F. and a screen pack consisting of three different mesh screens: 20, 40, 60 was used to clean the melt stream. This material was pelletized and extrusion coated onto a two mil high gloss American Hoechst 2000 polyester film. This polyester carrier provides a smooth glossy surface upon which the hot extrudate formed a thin clear film ranging from about 0.1 mil to about 2–3 mils thick. In this example a 2.5 inch extruder was used to extrusion coat a one mil PVDF/acrylic clear topcoat onto a two mil gloss polyester carrier. The compounded pellets were dried and extruded under heat and at a speed similar to the conditions described in Example 3. The high gloss chill roll was maintained at 60° F. for the entire run. At these settings the clear film had a weight of 38 gm/m². No corona treatment was used. When a higher corona treatment was used on the polyester web prior to reaching the extrusion coating nip, half moon defects were noted in the clear film, similar to Example 3. The film was subsequently coated with a solvent based black Avloy® color coat (using a Bird bar) and was then dried. The black color coat had the following formulation:

|   | INGREDIENTS | PARTS |
|---|---|---|
| 1 | N-methyl pyrollidone | 38.00 |
| 2 | Elvacite 2042 | 4.06 |
| 3 | Kynar 10052 | 12.00 |

The resins are dissolved in the solvent under heat at 130° F. The following pigment dispersion is then added:

|   | INGREDIENTS | PARTS |
|---|---|---|
| 1 | Black dispersion-GCW #428-A056 | 20.00 |
| 2 | N-methyl pyrrolidone | 8.3 |
| 3 | Exterior white | 0.54 |
| 4 | MEK | 15.7 |

The resulting foil was laminated to an acrylic primed 30 mil black ABS sheet with a rubber roll held at 400° F. and a line speed of 14 ft/min. The resulting laminate was draped in the thermoformer for 29 seconds, and the laminate sheet reached a surface temperature of 340° F. This draped sample was compared with a similarly prepared sample (from Example 3) to determine relative levels of hazing. The film in Example 3 showed the least hazing, and the laminate prepared from the film of Example 4 showed more hazing. Example 3 was deemed superior because the higher acrylic content in these formulae is believed to retard phase separation.

EXAMPLE 5

A comparative evaluation was made between the formulation in Example 2 and the following formulation:

|   | INGREDIENTS | PARTS |
|---|---|---|
| 1 | Kynar 2850<br>Polyvinylidene difluoride (PVDF)<br>Elf Atochem North America | 60.0 |
| 2 | VS100<br>Polymethyl methacrylate (PMMA)<br>Rohm and Haas | 40.0 |

-continued

|   | INGREDIENTS | PARTS |
|---|---|---|
| 3 | Tinuvin 234<br>UV stabilizer<br>Ciba-Geigy | 2.0<br>(pph) |

Kynar 2850 is an extrusion grade PVDF copolymer. Kynar 2850 has a melting temperature of about 155° C., a Tg of about −35 to −40° C., and a melt viscosity (measured in Pa·sec) at 100, 500 and 1,000 sec$^{-1}$ of 1,170–1,273, 494–508 and 326–330, respectively. The PMMA is compatible with the PVDF and its temperature/viscosity profile closely matches Kynar 2850. The melting point of the homopolymer Kynar 720, 165°–170° C., is higher than the melting point of the copolymer Kynar 2850, 155°–160° C. Kynar 2850 has less tendency than Kynar 720 to crystallize and thereby may produce a clearer PVDF/acrylic film when subjected to heat.

The formulation was compounded using a twin screw extruder to obtain uniform blended pellets. The two resins were dried before being extruded into pellets. During the extrusion process a vacuum vent in the compression zone of the screw was used to further remove moisture and other volatile components. The heating zones of the extruder were set at (1) 100° F., (2) 380° F., (3) 380° F., (4) 385° F., (5) 385° F., (6) 385° F. and (7) 385° F. The crew was maintained at 70 rpm. The melt temperature of this formulation was maintained at 380° F. and a screen pack consisting of three different wire meshes (20, 40 and 60) was used to clean the melt stream. This material was pelletized and extrusion coated on two mil high gloss Hostaphan 2000 polyester carrier film. The hot extrudate can form a thin clear film ranging from 0.1 mil to 2 mils thick. (The extruded material had a melt viscosity (Pa·sec) at 100, 500 and 1,000 sec$^{-1}$ of about 888, 405 and 266, respectively; a melting temperature of about 147° C., and a Tg of about 23–33° C.) While faster line speeds result in a thinner film, faster screw speeds result in thicker films. In this example a 1.75 inch lab extruder was used to extrusion coat a one mil PVDF copolymer/acrylic clear topcoat onto a two mil high gloss polyester carrier.

The compounded pellets were dried at 150° F. for two hours prior to being fed into the extruder. The extruder had ten heating zones which were set at (1) 330° F., (2) 380° F., (3) 380° F., (4) 405° F., (5) 415° F./clamp, (6) 420° F./tube, (7) 420° F., (8) 420° F., (9) 420° F. and (10) 406° F./die; the die was coat hanger and the melt was maintained at 434° F. The screw speed was held at 166 rpm with a corresponding line speed of 150 ft/min. The high gloss chill roll setting was maintained at 70° F. for the entire run. A welded screen pack was used to clean the melt stream. At these settings the one mil clear coat had a weight of 38 gm/m². The finished film was high gloss, but had some microgels and some small contaminants were observed. The defects were not objectionable in finished parts. No corona treatment was used.

One roll of the formulation produced in the above production extrusion coating run was coated in the lab with a teal metallic Avloy® color coat. This material was laminated to primed ABS. The resulting laminate was thermoformed, die cut, and injection clad to produce a finished part.

EXAMPLE 6

The purpose of this trial is to make a coextrusion sheet for a base coat/clear coat paint film.

A single layer ABS sheet, 20 to 30 mils thick can be sized for adhesion by transfer laminating either at the extruder or at a separate operation with an acrylic layer (Elvacite 2009) that has been solvent cast onto a polyester carrier. The need to solvent cast the acrylic layer to a polyester carrier film on a reverse roll coater and subsequently transfer laminate it to ABS is eliminated, thereby simplifying the process.

This example illustrates an alternative method of producing a primed ABS sheet which can be laminated with a base coat/clear coat foil to produce a laminate product. This primed ABS sheet is produced by coextrusion of a composite acrylic/ABS sheet. Eliminating the solvent coating and lamination steps can increase both the laminating and coating capacity of a plant and lower the cost and time required to produce the laminate.

On a thick film line, two extruders were used to coextrude a composite acrylic/ABS sheet. Extruder A was fed acrylic resin and not vented; whereas, extruder B was fed ABS resins and was vented to further remove water and other volatile gases. Both the acrylic resin and the ABS resin require drying of excessive moisture before extruding. This is accomplished by drying the resin for at least two hours at 150° F. for the acrylic and 170° F. for the ABS. The resin is below 0.08% moisture content to prevent extrusion problems. Typically it is extruded at a moisture content between 0.02% to 0.04%.

Dried resin pellets of each material are fed into the hoppers on the top of each extruder via vacuum tubes. From the hoppers the pellets are gravity fed into the feed section of the extruders' barrel, screw fed through the barrel, and heated to a molten state. The two resins in each extruder are fed through their respective barrel sections to a single feed block and then into the die of the extruder. The molten sheet exits the die and runs through a three roll calendaring (polishing) stack which polishes both sides of the sheet. As the sheet travels down the line it is cooled by passing it over chilled steel rolls and finally is wound up into a roll. The finished sheet comprises about 1.5 mil acrylic size layer and about 28.5 mil ABS layer for a total thickness of about 30 mils.

The melt temperature data were as follows:

-continued

| Polished roll temperature | START | END |
|---|---|---|
| TOP | 170 | 170 |
| MIDDLE | 150 | 150 |
| BOTTOM | 145 | 180 |

The reason for change in the middle and bottom from start to end was to set the sheet in calendar stack. Extruder "A" was not vented—"B" was vented for moisture and gas removal.

|  |  | START | END |
|---|---|---|---|
| Screw speed (rpm) | A | 8.4 | 6.5 |
|  | B | 64.2 | 7.5 |
| Back pressure (psi) | A | 3,010 | 2,920 |
|  | B | 4,240 | 4,390 |
| Coextruder thickness (mil) |  |  |  |
| A layer |  | 2.5 | 1.5 |
| B layer |  | 27.5 | 28.5 |

Two carrier-supported base coat/clear coat films (midgloss black and emerald green) were fed into the calendaring stack and laminated to the acrylic side of the coextrusions. The carrier was then removed. This process combines the coextrusion of the sized backing sheet with lamination of base coat/clear coat foil so the resulting laminate is ready to be thermoformed prior to subsequent molding of exterior automotive parts.

EXAMPLE 7

The following formulation of an extrudable color coat material was pelletized and the pellets were fed into an extruder in an extrusion coating station. The extruded color coat was deposited on the extrusion coated web passing below extruder die slot.

|  |  |  |  |  |  |  |  |  |  |  | ADAPTER | | FLANGE | | Coextrusion |
|---|---|---|---|---|---|---|---|---|---|---|---|---|---|---|---|
| 1 | 2 | 3 | 4 | 5 | 1 | 2 | 3 | 4 | 5 | 6 | A1 | A2 | Mixer | Slide | block |
| INITIAL 435 | 435 | 410 | 450 | 450 | 480 | 460 | 411 | 450 | 445 | 450 | 400 | 400 | 410 | 400 | 400 |
| FINAL 430 | 410 | 420 | 409 | 404 | 480 | 470 | 430 | 450 | 460 | 460 | 400 | 400 | 480 | 450 | 400 |

The reason for changes in the melt temperatures was to improve movement of molten resin through the extruder by increasing melt temperature to reduce the molten viscosity. Other operating conditions were as follows:

| Die Temp. | 440° F. all zones |
|---|---|
| Melt Temp. | 408° F. |
| Line Speed | 39.8 ft/min |
| Screw -- Ext. A LD ratio | 24:1 |
| Screw -- Ext. B LD ratio | 32:1 |
| Screen pack at breaker plate | A = 2,40 mesh screens |
|  | B = 3 @ 20, 40 & 60 mesh screens |

|  | INGREDIENTS | PARTS |
|---|---|---|
| 1 | Kynar 720 Polyvinylidene fluoride Atochem | 48.0 |
| 2 | Jet Black No. 1 Copper. chromate black spinel The Shepherd Color Company | 20.0 |
| 3 | VS100 Polymethyl methacrylate (PMMA) Atohaas | 32.0 |

This formulation was compounded using the Werner Pfleiderer Model 53MM twin screw extruder to obtain a uniform blend. The two resins were dried in a desiccator hopper with a 0° F. dew point at 150° F. for eight hours before being extruded into pellets. During the extrusion process the vacuum vent in the compression zone of the screw was used to remove moisture and volatile components. The dried resins of the color coat were fed into the extruder. The seven heating zones of the extruder were set: (1) 100° F., (2) 370° F., (3) 370° F., (4) 370° F., (5) 370° F., (6) 370° F., (7) 370° F. The screw was maintained at 64 rpm using 600–670 H.P. and a corresponding current of 54–59 amps. The melt temperature at the die was maintained for 367° F., and a screen pack consisting of three different wire meshes; 20, 40, 60 was used to clean the melt stream. The material was pelletized. Press outs were used to monitor the uniformity of the blend.

The above formulation was extrusion coated onto an extrusion clear top coated web to form a one mil color coat on the clear topcoat with a corresponding weight of 44 gm/m$^2$. The pellets were dried at 0° F. dew point, 150° F. for eight hours prior to extrusion coating the color coat. The 2.5 inch extruder was held at 60 rpm and the five heating zones were set at: (1) 390° F., (2) 400° F., (3) 410° F., (4) 420° F., (5) 420° F. This film was laminated to 30 mil primed black ABS(400° F., 2X, 8 ft/min); it was also laminated to primed gray ABS to check for opacity. Both laminates were thermoformed.

The previous description relates to use of the invention in producing exterior and interior automotive body panels. The invention also can be used for other applications such as the manufacture of outdoor siding panels described in application Ser. No. 08/793,836, which is incorporated herein by reference.

That application describes extrusion coating on a matte release carrier, a thermoplastic extruded clear coat which can be embossed with three dimensional impressions and a micro-roughness from the carrier while extruding the clear coat at a line speed in excess of 200 ft/min, and applying multiple coatings to an extruded PVDF/acrylic transparent film to produce a decorative foil having a wood grain appearance. Application of woodgrain print coats and extrusion/lamination techniques also are described, together with formulations and extrusion/lamination techniques for making vinyl outdoor siding panels with woodgrain transfer foils.

Application Ser. No. 08/793,836 also describes an acrylic size coat applied to an extruded PVC sheet for bonding the decorative foil. Alternatively, a backing sheet may be made from a thermoplastic olefin such as polypropylene or polyethylene, in which case the size coat is made from a thermoplastic chlorinated polyolefin (CPO), preferably a chlorinated polypropylene or chlorinated polyethylene, in which the coating composition contains about 10% to about 60% by weight of CPO, and correspondingly, about 50% to about 90% by weight solvent.

EXAMPLE 8

Figure 13:
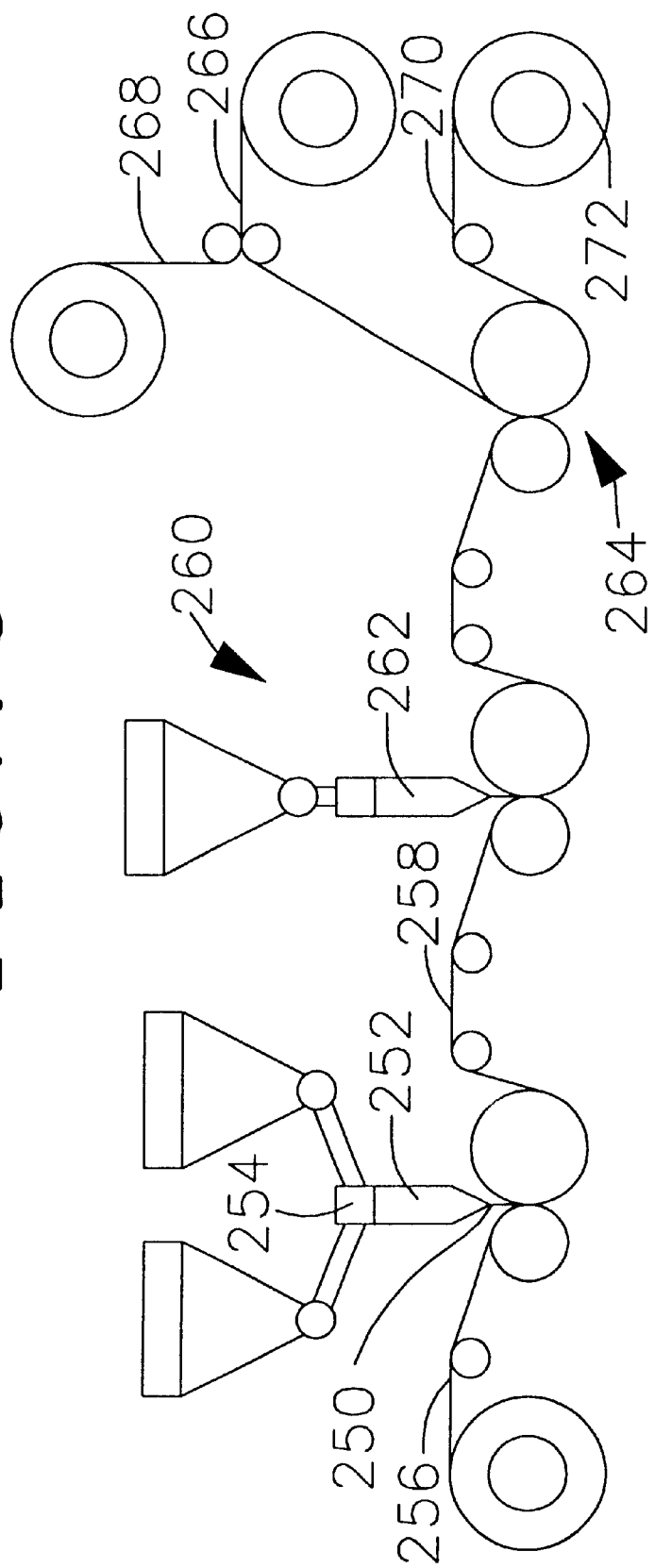
FIG. 13 is a schematic diagram illustrating an embodiment of the invention in which a carrier sheet is co-extrusion coated with a clear coat with a coating of a color coat, an optional extrusion coating of a PVC color coat, and transfer of a pressure sensitive adhesive.

The formulation of Example 4 was coextruded with other polymeric materials as illustrated in FIG. 13. A coextrusion melt 250 comprising a clear coat and a primer coat is extrusion coated onto a 2 mil high gloss polyester sheet, such as Hostaphan 2000 from American Hoechst. This process used an extrusion coating station equipped with two extruders. One extruder is fed a clear coat material as described in Example 3. The second extruder is fed a primer coat; this primer acts as a tie between sheet PVDF/acrylic clear coat and the color coat. The melt stream from both extruders is fed into a feed block 252; the partitioned melt then flows to an extrusion die 254. This melt is extrusion coated onto the polyester sheet such that the clear coat is in contact with PET. The polymeric materials contained in the primer consist primarily of acrylic and/or vinyl resins. The preferred acrylic resin is polyethyl methacrylate (PEMA). Other minor amounts of solids, such as UV stabilizers, pigments, and fillers may also be present in the prime coat formulation. The primer coat is applied to the clear coat side of the web 256, and is used to enhance the chemical bond with the color coat.

After the primer coat is applied, the coated carrier sheet 258 passes to another extrusion coating operation 260 where an extrusion coated color coat is applied from an extruder die 262 to the primer coat side of the web. This color coat can comprise various resins, including PVDF, acrylic, PVC, and urethane, plus other additives and fillers, including pigments, heat stabilizers, and light stabilizers.

The web then passes to a laminating station 264, where a pressure sensitive transfer tape 266 is applied to the color coat side of the web. The laminating station includes the heated drum and pressure roll described previously. The transfer tape had been previously coated using conventional reverse roll coating techniques, and is protected by a release coated carrier sheet 268. The extrusion coated and adhesive coated carrier film 270 is then wound as a take-up roll 272.

This construction was used in an exterior automotive application where pressure sensitive films are typically used, and maintained a high gloss and a high DOI.

EXAMPLE 9

Two trials were conducted in which substrates were coextruded with a size layer for laminating to exterior dry paint films.

In one trial a one mil urethane modified polyethylene adhesive layer (MOE 2, Elf Atochem) was coextruded with a one mil modified polyethylene tie layer (Admere SF-700, Mitsui), both of which were coextruded with an 18 mil TPO backing sheet (a polypropylene Dexflex, DNS Plastics International). In another trial a one mil urethane modified polyethylene adhesive layer (MOE 2) was coextruded with a one mil modified polyethylene tie layer (Admere SF-700), both of which were coextruded with an 18 mil polypropylene (homopolymer) backing sheet. The three-layer coextrusions were successful in laminating to dry paint transfer films with good adhesion. The coextrusions were each laminated to: (1) a one mil high gloss PVDF/acrylic clear coat/0.5 mil black PVDF/acrylic color coat paint film having a 0.1 mil PMMA size coat; (2) a high gloss PVDF/acrylic clear coat (one mil)/color coat (0.5 mil red) paint film having a 0.1 mil PMMA size coat; and (3) a one mil PVDF/acrylic monocoat mid-gloss black paint film with no size coat.

The urethane modified polyethylene adhesive layer provided good adhesion to the PVDF/acrylic dry paint transfer films, and the modified polyethylene tie coat provided good adhesion to the olefin backing sheets. The coextrusions were successful in that their melt temperatures were reasonably close to each other, within a range of about 50° F.

Compounding of the resin can be a critical aspect of the extrusion process. A preferred formulation for the starting material used in extruded film trials described below comprises a 60/40 blend of PVDF and PMMA along with a UV stabilizer comprising about 2% of the total blend. Other formations can be used, as described below. In addition, the extrusion techniques described herein are generally applicable to clear coat films extruded at a film thickness of about 0.5 to about 2 mils, and for the trials described below, coat thickness was about one mil.

A suitable extruded film, particularly for exterior automotive use, requires minimal optical defects in order to ensure reasonably high optical clarity in the finished clear coat outer film. Optical defects in the extruded film can be caused by dirt particles and other entrained contaminants from the extruder and/or by formation of gels in the extruded material. For instance, extruded coatings containing PVDF polymers are subject to gel formation at high extrusion temperatures. Crosslinking of vinylidene fluoride polymers increases at high melt temperatures, leading to a greater number of defects caused by gel formation. One of the objectives of the invention is to maintain high line speed while producing extruded films with minimal defects. However, there is a relationship between line speed and the number of defects for a given extruder. If extruder screw rpm must increase to produce higher line speeds, more shear and heat generation in the extruded material may cause gel formation and resultant optical defects.

Variations in processing can reduce formation of defects caused by gel formation in the extruded clear film. As mentioned, gel formation from the PVDF component is a main contributor to defects, and one approach is to remove one "heat history" from the melt by a two-step melt extrusion process in which the PVDF is subjected to less heat. The two-step process involves: heat history 1—making pellets from the acrylic material and UV stabilizer, in the absence of PVDF, followed by heat history 2—making the extruded film in which the PVDF is dry-blended with the pellets made in the first processing step. This avoids the one "heat history" of subjecting the PVDF to heat in producing pellets from the PVDF along with the acrylic and UV stabilizer. Tests have shown that films with too high a level of defects were made by melt blending the PVDF, acrylic and UV stabilizer together to make pellets because of the high shear required to properly blend the components.

EXAMPLE 10

In one experimental test for making an extruded film, a twin-screw extruder was used. Twin-screw extruders can have an advantage over single-screw extruders because they can mix the materials at low shear, which minimizes temperature rise during compounding. This extrusion trial involved pellets made by removing the one "heat history" of the PVDF from the compounded material. The UV stabilizer Tinuvin 234 (Ciba Geigy) in powder form was distributed in an acrylic component comprising VS100 (Rohm and Haas) PMMA in pellet form. These materials were extruded in a first pass through the extruder to form pellets while avoiding exposing the PVDF to one extrusion pass. A high extrusion temperature above the gel temperature of the PVDF (in order to properly blend the acrylic and UV stabilizer) can be used in the first pass because of the absence of the PVDF. In one trial this temperature was 460° F. An extrusion-grade PVDF (Kynar 720) was added in pellet form to the second extrusion pass in which an extruded clear film having low gels and defects was produced when extruded at 400° F. In one trial in which a one mil thick clear coat film was extruded onto a PET carrier, defects were observed to drop fourfold (from a 50 to 60 gel count to a 10 to 15 gel count) when compared with a trial involving initially making the PVDF in pellet form and extruding all three components together, followed by extruding the resultant material into a film.

EXAMPLE 11

As an alternative to a twin-screw extruder, a single-screw extruder was designed which permitted extrusion of the film at lower shear and a lower melt temperature. The extruder flights were designed to increase output and reduce melt temperatures. A low-corrosion Chromalloy material was used for the screw extruder. The extruder comprised a 2½-inch Black Clawson single-screw extruder at 30:1 L/D. The extruder flights were reduced and the tolerance between the flights and the inside of the extruder barrel was increased, both of which reduced the shear and temperature build-up during extrusion. Clear films one mil in thickness were produced on a PET carrier with greatly reduced gels and defects. In one trial, extruder screw speed was 68 rpm, extrusion melt temperature was about 400–410° F. at the extruder die opening, barrel temperature of the extruder was about 370–380° F., melt pressure was about 2,800 psi, and the chill roll was operated at 75° F. Line speed was 135 ft/min at a web width of 51 inches. A defect count in the range of 3–15 was produced, based on a C-charting test method described below. It was observed generally that the extruded film clears up at reduced extruder rpm. Raising the chill roll temperature to 85° F. also appeared to improve film clarity in one trial.

EXAMPLE 12

Another approach in reducing defects in the extruded film is with a powder-to-film briquetting process. In the original process of making PVDF, the product is in powder form which comes directly from the reactor when the PVDF is polymerized. In order to attain the objective of producing prills, or briquettes, with minimal heat, the prills can be produced in a single-step process from the original powder form of PVDF, PMMA and the UV stabilizer. A dry extruder with large compaction rolls applies pressure to the powder-form materials to produce compaction into prills without melting.

In one test, 86.4% powder-form PVDF, 10% PMMA and 3.6% Tinuvin 234 was compacted into prills. The prills were then extruded with PMMA to adjust the final blend ratio to the preferred 60/40 ratio, and the resulting extrusion formed a clear film having low defect levels. The powder-form materials are subjected only to pressure with minimal heat to compact them into the briquettes. In one trial, material was compacted at 2,400 psi with a temperature rise of about 130° F. This process avoids subjecting the PVDF to shear and high temperature normally involved in making pellets.

EXAMPLE 13

In another approach for making extruded clear films with minimal defects, a PVDF/acrylic extruded film was made from a large single-screw extruder. This extruder was designed to provide a short minimal distance between the extruder outlet and the die inlet opening so as to minimize melt travel. A screen pack using 20/40/60/80/100 mesh screens was placed between the extruder outlet and the die inlet opening. In one embodiment, the distance between the extruder outlet through the screen pack to the die inlet opening was less than about two feet. This large six-inch-diameter single-screw extruder was operated at a low rpm which in one trial was 24 rpm. Because of its low speed and reduced wall contact with the extruded material over the short distance of travel, the polymer melt experienced low shear. Also, as described below, an extruder having a screw operated at a moderate compression ratio produces a desired low level of shear. Temperature of the extruded material was also low, about 400° F., well below the 450° F. gel temperature of the PVDF component. Preferred operation of the extruder maintains maximum internal extrudate temperatures to below about 20°–30° F. below the 450° F. gel temperature of the PVDF. The extruder produced a clear film extruded at one mil thickness, 51 inches in width, on a traveling PET carrier. The resulting extruded clear coat film was essentially defect-free. Line speed also was approximately 160–170 ft/min. The low defect level was attributed to the large-volume, low-shear operation of the extruder. A similar trial run conducted with the 2½-inch single-screw extruder (described previously) operating at the same line speed produced a film with greater defects because of higher temperature and shear. Generally speaking, because of the reduced volume of the 2½-inch single-screw extruder, line speed would be reduced if shear and temperature are reduced to produce fewer defects.

The number of visual defects in a finished extruded film is measured to determine the optical quality of the film. This test procedure, referred to as C-charting, involves determining a standard definition for what a defect comprises, by determining the maximum size of gels, fisheyes or other optical defects which can be tolerated without adversely affecting acceptable film clarity. A second C-charting standard sets the maximum number of defects acceptable for a given surface area of the finished extruded film. The defect count can be charted by plotting the number of defects in a given area at selected time intervals as the extruded material is being produced. The charting can reveal undesired shifts, trends, cycles or patterns in the extrusion process.

In one test standard, the film is viewed on a flat surface with a predetermined light source and the film is visually inspected for defects. Any non-uniformity (or non-conformity) larger in diameter than 0.8 mm is considered a defect, and the number of defects per eight square feet of extruded film are counted, although this standard area can vary. An acceptable film can be determined to comprise a film having an average defect per area count below a preset value, which in one test standard is five defects or less per eight square feet of surface area. This sample area is determined as a result of conventional film extrusions 48 inches wide, with test samples taken at two feet intervals. (In the extrusion trials described previously in which film width was 51 inches, defects were counted for 8½ square feet areas.)

EXAMPLE 14

The material used for this trial comprised Kynar 720 PVDF/VS100 PMMA/Tinuvin 234 UV stabilizer in a 60:40:[2 pph] blend. The process described above for making PVDF/acrylic pellets with minimal exposure to heat was used to prepare the starting material. The extruder comprised an Egan six-inch single screw, single flight extruder. The distance between the extruder outlet and the extruder exit opening was less than about two feet, and a screen pack using 20/40/60/80/100 mesh screens was interposed between the extruder outlet and the die inlet opening. An extruded clear film coating approximately one mil in thickness was extruded at a web width of 51 inches onto a traveling PET carrier film. Initial start-up was begun utilizing the Kynar/acrylic blend. The extrusion profile was 450° F. to facilitate screw coating at low amps. Once the polymer flow was established, the barrel temperatures were reduced and the coating process was begun on a poly-coated paper substrate to assist in gauge setup. After gauging was sufficient, the PET substrate was begun. The extruder was operated at a low rpm to prepare a total of 13,000 feet of film. Several trials were conducted. In one set of trials, extruder rotation was 24 rpm in order to produce the greatest line speed of 157 ft/min. Other trials were conducted at 19 rpm to produce a line speed of 126 ft/min and at 15 rpm to produce a line speed of 100 ft/min. Melt pressure of the extruded material varied from 830 psi for the 24 rpm operation to 730 psi for the 15 rpm operation. The chill roll temperature was maintained at 75° F. in all trials. Extruder die zone temperature varied from about 400° to 430° F. during the trials and barrel zone temperature varied from about 350° to 375° F. In all trials that were conducted, essentially zero defects were produced in the extruded films, resulting in a film having excellent optical clarity with the requisite quality attributes for exterior automotive use.

The PVDF/acrylic formulation ratio can affect film clarity. In general, the preferred PVDF-to-acrylic ratio is from about 55% to about 65%, by weight PVDF and from about 35% to about 45% acrylic, by weight of the total PVDF/acrylic solid polymers contained in the formulation. In a more preferred embodiment, films with the good clarity are produced with a PVDF-to-acrylic ratio of 57 to 62% PVDF and 38–43% acrylic resin.

Optical defects caused by gel formation can be reduced to an essentially zero-defect state by reducing the level of heat and shear to which the extruded material is exposed both during preparation of the starting material that goes into the extruder and during extrusion to produce the finished film. Such gel formation is controlled to within acceptable limits by controlling starting material preparation and film extrusion so that heat and shear do not cause the material to be exposed to temperatures at or above the gel formation temperature of any of the polymers contained in the processed material. By operating all such steps in the process so that temperatures within the processed material stay at no more than about 20°–30° F. below the gel formation temperature, an essentially zero-defect extruded clear film can be produced. The resulting film is thermoplastic and thermoformable into high gloss and DOI films suitable for exterior automotive use.

As mentioned previously, the melt viscosities of the blended polymeric materials are matched so they are reasonably close to each other, so that flow characteristics of the alloyed materials can be improved when heated to the extrusion temperature. Matching the melt viscosities of the PVDF and acrylic resins is important during the mixing process, as it can produce more uniform flow which can avoid the negative effects of high shear and formation of visible defects in the hardened film. The previous melt viscosity data show that highly transparent films are produced when melt viscosities of the alloyed materials are in the following ranges:

| | Melt Viscosities (Pas · Sec) at 215° C. vs. Shear Rates (sec$^{-1}$) | | |
|---|---|---|---|
| | 100 | 500 | 1000 |
| PVDF | 1125–1300 | 450–525 | 300–350 |
| Acrylic | 900–1000 | 400–450 | 225–300 |
| Blended PVDF/Acrylic | 725–925 | 275–425 | 175–300 |

The previous melt viscosity data also show that, generally speaking, melt viscosities for the blended PVDF and acrylic resin components are considered reasonably close to each other so as to produce the desired mixing effects when the PVDF component has average melt viscosities (Pas·Sec at 215° C.) of no more than about 375, 125 and 100 greater than the average melt viscosities of the acrylic resin, at shear rates of 100, 500 and 1000 sec$^{-1}$, respectively.

In addition to producing extruded films of such high optical clarity, there is a need to produce the films at reasonably high line speeds. As mentioned, increasing extruder rpm can increase line speed, but increased extruder rpm can produce more shear and heat, leading to more gel formation. To meet the objective of producing films at line speeds in excess of 100 ft/min, a large volume extruder operating at an extruder rotational rate of less than 50 rpm and producing an extruded film with a die exit opening temperature of about 20°–30° F. below gel formation temperature can produce essentially defect-free extruded clear films. Melt pressure also is an important consideration and an extruder melt pressure of below about 2,000 psi is preferable, more preferably below 1,000 psi, and most preferably below about 700–800 psi. For the PVDF/acrylic extruded films to produce exterior weatherable automotive paint films of acceptable optical quality, the extruder has been shown to produce line speeds above 160 ft/min by operating a sufficiently large volume extruder at below about 50 rpm, and more preferably below 30 rpm, while maintaining extrusion temperatures of the film extruded from the die exit opening to about 30°–50° F. below the gel formation temperature of 450° F.

EXAMPLE 15

The high optical clarity PVDF/acrylic extruded clear film of this invention also can be used as a weatherable protective outer coating for windows. In one process the clear film is extruded onto the PET carrier as described above. The PET carrier and clear film are then transfer-laminated to a laminate comprised of an outer adhesive coat and a metallized layer on a polyester film. The extruded clear coat layer is transfer-laminated to the adhesive layer and the PET carrier is removed to produce a composite comprised of the clear outer film/adhesive/metallized layer/PET film. This composite is then laminated to a layer of glass with an intervening transparent adhesive layer. The clear film provides good optical clarity and weatherability for the window gloss composite.

In addition to the defects caused by gel formation and induced haze, it has been discovered that other sources of defects also can negatively affect optical clarity of a clear film made by solventless extrusion. Even though gel formation and induced haze problems can be overcome and yield high clarity extruded films, it was observed that random defects were still produced in the finished film. These defects were particularly noticeable in thin high gloss transparent films extruded to a thickness of about one to three mils. Tests conducted on finished extruded films to determine the source of these random defects revealed that micron size contaminants (particle sizes of 10 microns or less) of various types were being introduced into the process. The primary sources of such contaminants were determined to be glass fibers, cellulose fibers, polymer dust, lint and the like—airborne contaminants that can enter the resin handling and extrusion coating process at various stages. Evaluation revealed that such airborne contaminants may enter the process at the following stages:

(1) The resinous starting materials. This includes not only the clear coat resin starting materials, but also the resins for making extruded sub-components of the finished laminate such as a coextruded size coat and backing sheet.

(2) The process of handling the resinous materials prior to extrusion. This can include the steps of blending the resin materials, drying the resin materials, and conveying the resin through the initial processing steps of blending and drying prior to transporting the dry blended extrudable resinous material to the commercial extruder.

(3) The production extrusion coating equipment. This includes the carrier web prior to and after extrusion in which the web can pick up airborne contaminants either directly or by static electric charges.

Figure 14:
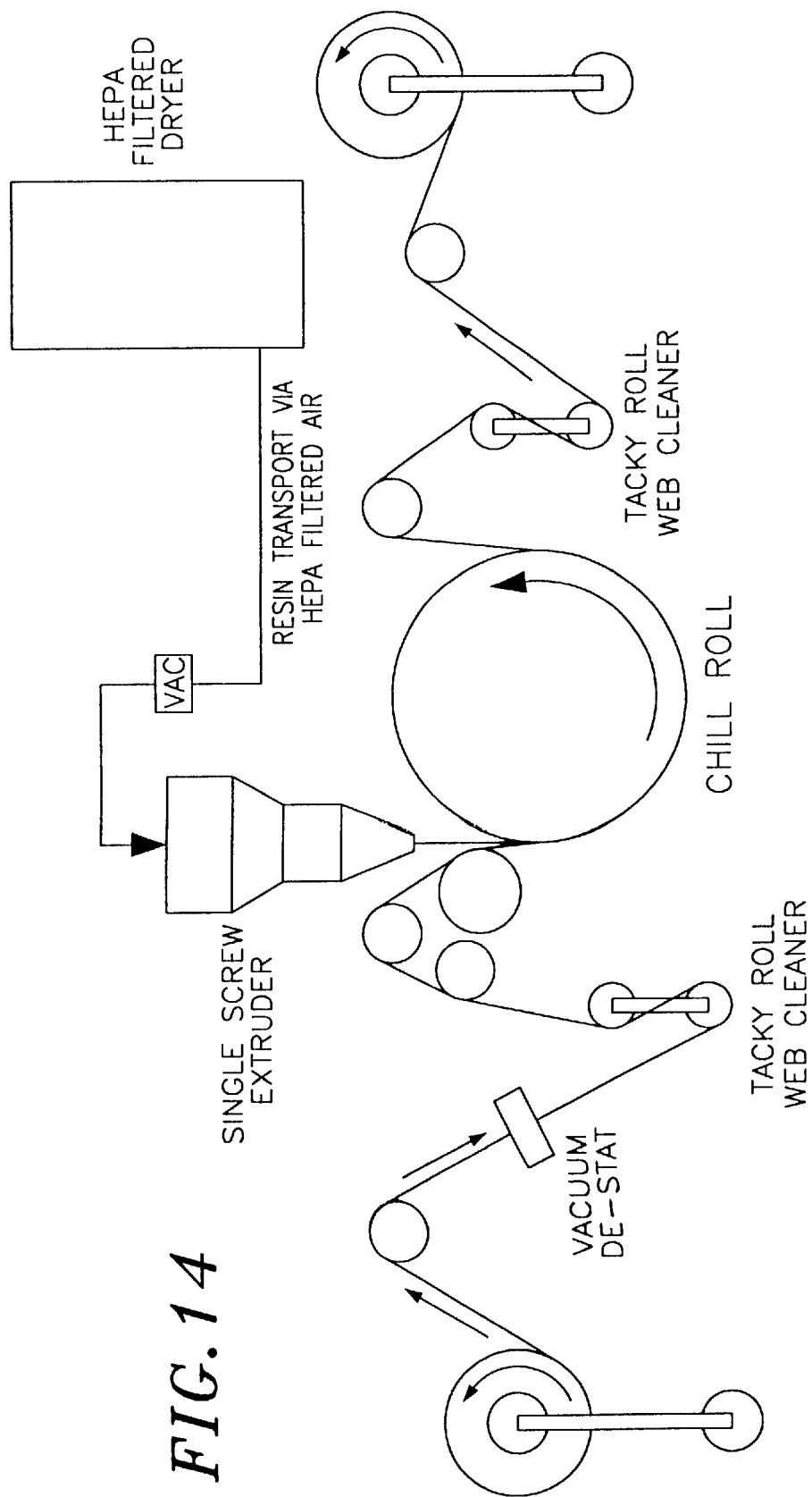
FIG. 14 is a schematic diagram illustrating an extrusion coating process and a process avoiding introduction of airborne contaminants to production equipment coming into contact with an extruded film in a process for producing essentially defect-free extruded clear coat films.
Figure 15:
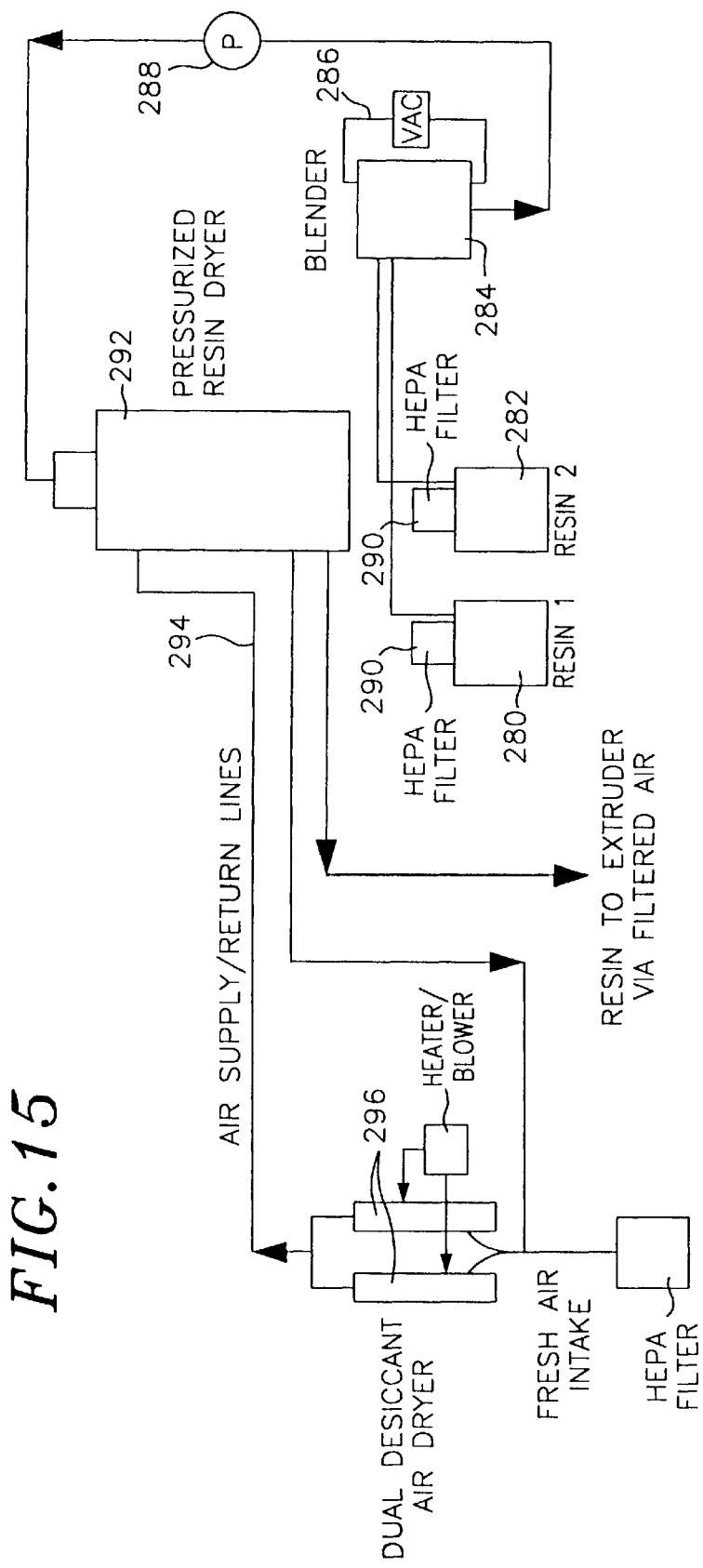
FIG. 15 is a schematic diagram illustrating processing steps which include a HEPA air filtered resin transport and dryer system for preventing introduction of airborne contaminants to the resinous starting material for the process of FIG. 14.

An improved process for removing such airborne contaminants is illustrated in FIGS. 14 and 15. FIG. 14 schematically illustrates an extrusion process modified to prevent introduction of airborne contaminants to production equipment coming into contact with the extruded film. FIG. 15 schematically illustrates processing steps for handling resinous materials prior to extrusion so as to avoid introducing airborne contaminants in the starting material after the starting material is processed prior to extrusion.

The system for pre-processing the resin, as illustrated in FIG. 15, includes a first container 280 for containing one resinous component in particulate form and a second container 282 for containing another resinous component also in particulate form. In one embodiment the resinous component in the first container is a PVDF resin in the form of contaminant-free pellets. The resinous component in the second container 282 can be acrylic and UV stabilizer resins blended in a pellet form also in a contaminant-free condition. During processing, the materials contained in containers 280 and 282 are transferred in parallel to a blender 284 through HEPA filtered lines 286 (HEPA filtration is described in more detail below). In the blender 284 the resinous materials are dry blended into a "salt and pepper" mixture of extrudable resin pellets. The resin handling system is connected to a central vacuum (not shown) through valve controlled HEPA filtered lines for drawing in outside air on demand to transport the resin through the system. The outside air is filtered through separate HEPA filters 290 on each of the resin containers. The resin containers are sealed to the outside environment except for the air inlets that draw the outside air through the HEPA filters.

The vacuum pressure available from the central vacuum transfers the blended resin pellets from the blender 284 through a HEPA filtered line 288 to a large volume pressurized resin dryer 292. Some resin materials may not require drying, however, acrylic resinous materials typically contain a sufficient moisture content that requires removal prior to extrusion. (It is desirable to extrude the blended resin pellets in a dry form and therefore any water content is removed prior to extrusion.) Although the other resin materials (PVDF and UV stabilizer) may not require drying, they are blended and sent to the dryer with the acrylic resin to simplify resin handling. The dryer is operated at a temperature of about 150° F. and is sealed from the outside atmosphere. Air passing through the dryer comes from air supply/return lines 294 on the outlet side of a dual column desiccant air dryer 296. Moist air from the dryer 292 is continuously returned from the dryer to the desiccator columns 296 through inlet lines 298. Fresh air from the plant environment is constantly pulled in through a HEPA filter 300 and an intake snorkel 302 leading to the desiccator columns 296. An electric heater and air blower 304 heat the air in the desiccator columns and force heated dry air from the desiccators through the air supply/return lines 294 to the dryer 292 in a closed loop. The desiccator columns undergo alternate treatment cycles. While one desiccator column is used to dry the moist air returned from the dryer, the desiccant bed in the other desiccator is redried through fresh HEPA filtered air drawn in to regenerate the desiccant bed.

An air exhaust (not shown) removes moisture from the desiccator columns. The dry blended resin pellets are then conveyed to the extruder via HEPA filtered air in a line 306 passing from the resin dryer 292 to the extruder 308 shown in FIG. 14.

Thus, all resinous materials are conveyed through the blending and drying stations and then to the extruder in a closed resin handling system in which conveying air is HEPA filtered to prevent airborne contaminants from the outside environment from entering the resin blending, drying and resin handling systems prior to conveying the resin to the extruder.

The resinous starting materials also are delivered to the system contaminant-free as described in more detail below.

The HEPA filters shown in FIG. 15 are high efficiency particulate air filters designed to filter micron size particulate substances from the air. These high efficiency filters typically include fused polymeric fiber filter media and are designed with different efficiency levels depending upon the application. For the purposes of the present invention, HEPA air filtration is an air filtration efficiency level sufficient to remove airborne particles that would otherwise cause a noticeable defect level in a one to three mil thick solventless extruded clear film of high gloss. Techniques for measuring defect levels in extruded clear films have been described previously (C-charting) and are further described below.

A HEPA filter capable of removing particles lower than about 10 microns in size is at least required for this invention. HEPA filtration efficiency below about 5 micron particle size is preferable and HEPA filtration efficiencies below about 0.7 to about 1.0 micron particle size are more preferable. A presently preferred HEPA filter for use with this invention is HEPA filter Model 2C2U10L rated at 99.99% efficiency at 0.3 microns available from Clean Air Products, Inc., Ronkonkoma, N.Y.

The resin which has been processed in the resin handling, blending and drying system of FIG. 15 is transported via HEPA filtered air to the extrusion coating line illustrated in FIG. 14. The extrusion coating line includes an unwind station 310 for storing a high gloss PET carrier or casting sheet 312 similar to the PET carrier sheet described previously. The casting sheet is unwound and passes through an anti-static vacuum station 314 and then around a pair of tacky roll web cleaner rolls 316 prior to passing to the extruder 308.

The anti-static vacuum station 314 removes any particles or contaminants that adhere to the carrier from static electric charges. Ionized air is blown onto the web and static electric dust particles are removed from the web. The anti-static vacuum system is available from Simco.

The tacky roll web cleaner comprises a pair of low adhesive lint rolls for pulling dust and other debris particles off of one face of the web. The tacky roll web cleaner rolls are available from R. G. Egan. The tacky roll web cleaner rolls 316 clean contaminants from the coating side of the web prior to the carrier sheet passing around idler rolls 318 and then to the nip of a pressure roll 319 at the extrusion coating station 320.

The extruder 308 can comprise any of the extruders described previously. The resinous materials transported to the extruder are extruded into a uniform clear coat film on the high gloss casting sheet by techniques described previously. In one embodiment the dry PVDF pellets are blended uniformly with the dry acrylic/UV stabilizer pellets in the extruder. Through the application of heat, the resin materials are extruded through the narrow gap die 322 as a uniform melt consisting of the blended PVDF/acrylic/UV stabilizer resins. The melt cast resin 324 is illustrated in FIG. 14 being cast on the previously decontaminated surface of the web. As described previously, the extrusion coated web immediately passes through the nip of the pressure roll 319 and the chill roll 326 and is drawn into direct contact with the highly polished surface of the chill roll 326 for cooling and hardening the melt cast clear coat film. The chill roll contact also imparts smoothness to the back side of the extrusion coated film. In the illustrated embodiment the gap width at the nip is about 30 to 40 mils and the height of the die from its extrusion opening to the nip is about six to seven inches.

The coated web passes around the chill roll 326 and then around an idler roller 328 before passing around a second tacky roll web cleaner combination 330. This second pair of tacky rolls is identical to rolls 316 and cleans contaminants from the side of the web opposite from the coating, prior to the finished coated web passing to a take-up roll station 332.

In addition to the contaminant removal steps described previously, other steps also can be taken to ensure filtering of micron size airborne contaminants from the resin handling and extrusion system. These further steps can include wet cleaning of the floors in the production area, elevation of HEPA filtered air intake levels to well above floor level, and carrying out the processing steps of FIGS. 14 and 15 in a HEPA filtered clean room environment. Such a clean room environment preferably would have a class 10,000 or better rating for the lamination equipment and the resin handling equipment. Preferably the region of the extrusion head would be at least class 2,000 rating. This can be accomplished by operating the extrusion coating station in a separate isolated booth which in one embodiment can be cubical in shape and approximately 10 feet per side.

The extrusion coating system of FIG. 14 and HEPA filtered resin handling and processing system of FIG. 15 can be used for producing various types of clear films and laminates according to this invention. For example, the FIGS. 14 and 15 embodiments were described with respect to producing a single layer extruded clear film made from a combination of PVDF and acrylic resins with a UV stabilizer pre-blended with the acrylic resin. Alternatively, the invention can be adapted for use with other polymeric materials for making other extruded clear films such as medical grade polyethylene or polyurethane, or other weatherable clear polymeric films made from vinyl resins, urethanes, or other acrylics, fluoropolymers or polyolefin resins, for example. In addition, the processing equipment can be adapted for making coextrusions. For automotive laminates as described previously, the processing equipment can be adapted for blending, drying and handling the resins in a closed HEPA filtered environment prior to coextrusion. The coextrusion and lamination steps also can be carried out to prevent contamination from airborne particulates. Examples of such coextruded laminates are coextruded ABS backing sheet and acrylic size coat combinations, or a coextruded TPO backing sheet and CPO size coat. As a further alternative, a CPO bonding layer can be coextruded as a tie coat with an acrylic size coat and a TPO backing sheet. Other coextrusions of similar bonding layers and backing sheet materials include ABS, polycarbonate, polyarylate, nylon, urethane, vinyl and fluoropolymer resins, for example.

As mentioned previously, the starting materials for the extrusion process of FIGS. 14 and 15 are initially produced in a contaminant-free condition. The starting materials also are transferred to the production site so as to ensure a contamination-free state prior to use in the extrusion process.

Resinous materials for use in making the extrudable films of this invention require the highest quality resins such as those characterized as CD optical grade resins. Resins for use in the present invention are produced by various industrial processes that commonly yield a resin in powder form. By virtue of the manufacturing process, introduction of foreign contaminants may occur. The resins for this invention must be made free of such contaminants, which can include hard particulates from the manufacturing process such as carbon, metal bits, glass fibers and gels produced by oxidation, corrosion or contamination. The process of manufacturing and handling the raw material also must prevent introduction of airborne contaminants. Production and handling in clean room environments and by HEPA filtration can produce high quality starting materials. Contamination of the raw material also can occur when certain different resins are blended into pellet form such as the acrylic and UV stabilizer resins described previously. In this instance the production process, including resin handling and blending of the different resins, is carried out to avoid introduction of foreign contaminants and airborne particles. Any extrusion of the starting material components also must be carried out below gel formation temperatures to avoid gels or similar defects in the starting material.

EXAMPLE 16

In one embodiment of this invention, a high quality extruded transparent outer clear coat film is produced by a combination of PVDF and acrylic resins and a UV stabilizer material as described previously. The starting material for the PVDF component comprises the extrusion grade homopolymer Kynar 720 available from Elf Atochem. This PVDF resin is a preferred starting material for exterior automotive clear coat films because of its better abrasion resistance and refractive index when compared with the PVDF copolymer Kynar 2850 which is more flexible and may be more useful in certain non-exterior automotive applications. The acrylic resin component is the highest quality CD optical grade PMMA resin VS100 available from Elf Atoglass. The UV stabilizer comprises Tinuvin 234 available from Ciba Geigy. These starting materials are essentially contaminant-free as described previously. The acrylic resin and UV stabilizer materials are initially compounded into pellets. The compounding process also involves avoiding introduction of contaminants including HEPA filtering and other measures similar to those described previously.

The starting materials can be checked for their contaminant-free state by first extruding each material as a free sheet and then measuring it for defects. For instance, the compounded acrylic resin/UV stabilizer pellets can be extruded as a thin sheet, and according to one test, the material is fit for use if it has an average defect level of 3 or less defects over an area 12 inches long by 15 inches wide for a sheet extruded to a thickness of about 4 mils. The minimum size of the defects involved in such defect count is in a range of about 0.4 to 1.0 $mm^2$. Any defects larger in size may lead to rejection of the starting material.

The PVDF and compounded acrylic resin/UV stabilizer materials are processed according to the resin handling and extrusion process described for FIGS. 14 and 15. The initial compounding ratio is 60 parts PVDF resin, 40 parts acrylic resin and two pph UV stabilizer. The extruder comprised a Black Clawson single screw extruder having a screw diameter of about six inches and a length of about 16 feet (L:D ratio of 32:1).

The melt temperature (° F.) data were as follows:

| | |
|---|---|
| Barrel 1 | 360 |
| Barrel 2 | 375 |
| Barrel 3 | 375 |
| Barrel 4 | 375 |
| Barrel 5 | 375 |
| Barrel 6 | 375 |
| Flange | 400 |
| Adapter 1 | 400 |
| Adapter 2 | 400 |
| Downspout | 400 |
| Die 1 | 430 |
| Die 2 | 400 |
| Die 3 | 400 |
| Die 4 | 400 |
| Die 5 | 430 |

Extruder operating conditions were as follows:

| | |
|---|---|
| RPM | 25 |
| Line speed (ft/sec) | 170 |
| Melt psi | 540 |
| Amps | 239 |
| Melt Temp (° F.) | 402 |
| Corona treater | off |
| Chill Roll Temp (° F.) | 61 |

A clear coat film made from these starting materials and extruded by the process of FIGS. 14 and 15 yielded an essentially defect free film. Defects were avoided from such sources as gel formation, induced haze and airborne contaminants. Defects were measured over an area of 1,248 square inches for a clear coat high gloss film extruded to a thickness of one mil. A typical approach for measuring defects is to overlay a TAPPI dirt estimation chart on the extruded sheet and to count the number of defects within the average surface area according to test methods T213 and T437. The film is considered essentially defect free if over this average surface area the defect count is 3 or less where measurable defect sizes are in the range of about 0.4 to 1.0 $mm^2$. Defects larger than 1.0 $mm^2$ are considered unacceptable. Defect sizes below 0.4 mm are considered undetectable to the eye. The finished film also was measured for haze on a standard haze meter and was essentially haze free, measuring less than 0.9 percent haze. A maximum haze value of 1.0 percent is considered acceptable.

EXAMPLE 17

An extruded transparent clear coat film is made by the process of Example 16, with the following modifications. The extruder was a 3.5-inch, 32:1 L:D Black Clawson with a twin flight barrier screw, operated at moderate compression in the range of 3:1 to 3.5:1. This example has shown that improvements in extrusion coating are produced with a moderate compression ratio in the range of about 2.5:1 to about 5:1, and preferably about 3:1 to about 4:1. An advantage of this extruder is reduced feed surging, resulting in a more stable melt and output from the extruder, which in turn yields a flatter web profile in the machine and cross web directions. The 3.5-inch extruder with the low shear moderate compression ratio barrier screw provided an excellent balance in output, residence time and shear with the added benefit of reduced web profile variation when compared with the 6-inch single flight screw of Example 16. Surging and down web variation was reduced from ±25 percent or more from nominal output to less than 5 percent total variation from nominal—less than the gauge noise level on single scans using an NDC Beta gauge device. Output with the twin flight moderate compression ratio barrier screw was equal to the 6-inch single flight screw of Example 16, yielding an ability to run a 56-inch wide coating at 38 gsm nominal thickness at line speeds greater than 300 fpm.

The extruded clear coat films of Example 16 and 17 can both be used for various applications requiring weatherable protective clear films of glass-like transparency. As mentioned previously, the invention can be used as a protective film for substrate panels made of polymeric materials, metal or glass. The invention also can be used for making high quality transparent free films such as medical grade or food grade plastic sheet materials and the like.

EXAMPLE 18

One use of the extruded high transparency clear coat films of Examples 16 and 17 is for exterior automotive laminates. In one embodiment, the extruded clear film is coated with a pigmented base coat paint film as described in previous examples. The base coat is preferably coated by solvent casting such as by reverse roll coater. The paint coat can comprise various thermoformable polymeric materials as previously described and can contain dispersed reflective flakes. Following drying of the base coat the carrier-supported base coat/clear coat film then can be laminated to a polymeric backing sheet and size coat which are coextruded as described previously. In one embodiment, the coextruded backing sheet and size coat are made of ABS and an acrylic resin, respectively.

Starting materials for making the ABS/acrylic coextrusion were as follows. The ABS resin was Cycolac LSA from General Electric. This resin must be of highest quality, essentially free of contaminants. The acrylic resin was the highest quality CD grade resin designated H-16-200, from Cyro, a rubber modified PMMA resin. The process for making these resins is controlled to enhance cleanliness so as to avoid generating defects from sources such as carbon, glass fibers, metal bits and gels. Both resin starting materials also are handled by the HEPA filtration techniques described previously to avoid contamination. Extruder A (ABS) had a screw diameter of 4½ inches and extruder B (acrylic) had a screw diameter of 2½ inches. Dried resin pellets from the ABS and acrylic starting materials are fed into the hoppers on the top of each extruder via vacuum tubes. From the hoppers, the pellets are gravity fed into the feed section of the extruder barrel. The pellets are screen fed through the barrel and heated to a molten state. The two resins in each extruder are fed through their respective barrel sections to a single combining block and then into the die of the extruder in a manner similar to that described in previous examples. The molten sheet exits the die and runs through a three roll calendering (polishing) stack which polishes both sides of the sheet. As the sheet travels down the line, it is cooled by passing it over chilled steel rolls and finally is wound up into a take-up roll. The final sheet comprises an approximately 1.0 mil thick acrylic lacquer size coat and an approximately 18 mil thick ABS backing sheet for a total laminate thickness of about 19 to 20 mils.

| Extruder A (ABS) - Melt Temp (° F.) | |
| --- | --- |
| Barrel Zone 1 | 435 |
| Barrel Zone 2 | 450 |
| Barrel Zone 3 | 300 |
| Barrel Zone 4 | 240 |
| Barrel Zone 5 | 320 |
| SC Body | 400 |
| Gate | 400 |
| Cyl. | 400 |
| Free | 400 |
| Die 1 | 403 |
| Die 2 | 407 |
| Die 3 | 400 |
| Die 4 | 400 |
| Die 5 | 400 |

| Extruder B (ABS) - Melt Temp (° F.) | |
| --- | --- |
| Barrel Zone 1 | 490 |
| Barrel Zone 2 | 510 |
| Barrel Zone 3 | 200 |
| Barrel Zone 4 | 490 |
| SC Body | 450 |
| Tube 1 | 450 |
| Tube 2 | 450 |
| Adapter 1 | 400 |
| Adapter 2 | 420 |

RPM 100
Drive amps 200
Back pressure (psi) 4,000
RPM 21
Drive amps 61
Back pressure (psi) 4,000
Top calender roll temp (° F.) 130
Middle roll 180
Bottom roll 140
Line speed (fpm) 60

The following observations were made with respect to the optical quality of products made by the process of this invention. With respect to the extruded clear coat/solvent cast color coat film laminated to the coextruded ABS backing sheet and acrylic size coat, significant defect reductions were observed. Laminates made without the handling/filtration process of this invention yielded from ten to over 100 defects per 24 inch by 36 inch laminate surface area. These defects were reduced to less than three per area when the handling/filtration process was used. Generally speaking, a gel count reduction of over 80% was observed. In addition, the sizes of gels were reduced. Without the filtration process of this invention, gel sizes were over 10 microns, whereas with the process of this invention, gel sizes were reduced to one micron or less.

Similar results were observed for extruded clear coats made with the HEPA filtration process of this invention. Films observed to have over one hundred defects in a 24 inch by 36 inch surface area were reduced to gel counts of 3 or less for a one mil coating over the same surface area. The gel count sizes were within the 0.4 mm to 1.0 mm range described previously.

With respect to the laminate described above, there was also a significant increase in measured DOI. For instance an initial DOI of 60 for a laminate not made by the process of this invention will increase about 3 to 5 units to about 63 to 65 with the HEPA filtration process of this invention.

As to DOI measurements generally, base coat/clear coat paint films in which the clear coat layers are made by extrusion techniques of this invention (with and without HEPA filtration) were compared with base coat/clear coat paint films made by solvent casting the clear coat layers. The paint films were subjected to the previously described process of laminating to a semi-rigid polymeric backing sheet and thermoforming to a three-dimensional shape with elongation in excess of 50%. In the critical areas of the finished parts, DOI measurements were taken with the Dorigon D47R-6 instrument and by a DOI instrument manufactured by ATI. Generally speaking, the ATI readings were approximately 97% the reading obtained with the Dorigon instrument, and therefore the readings were considered comparable. DOI measurements generally showed a 5 to 10 percent improvement for both solid colors and for metallic automotive paint films. Mar resistance also improved, particularly with the formulation of Example 5. DOI readings were generally in excess of 70 for parts having the solvent cast clear coat layer and were generally in excess of 70 to 80 for parts having the extruded clear coat layers. In one set of DOI measurements for a red metallic automotive facia part, DOI in the critical areas was about 10 units higher for parts having the extruded clear coat layer when compared with parts having the solvent cast clear coat layer.

The extrusion coated paint film also can be laminated to backing sheets and bonding layers coextruded from other materials. In another embodiment, a TPO backing sheet can be coextruded with a CPO tie coat layer. In order to enhance adhesion to a PVDF/acrylic base coat/clear coat film, the CPO tie coat also can be coextruded with an acrylic outer size coat layer. The starting materials for such a three-layer TPO/CPO/acrylic coextrusion are as follows:

The acrylic layer is made from the same PMMA acrylic resin described previously, H-16-200 CD optical grade resin from Cyro.

The CPO resin is a chlorinated polypropylene available under the designation 13-LP from Toyo-Hardlen. This CPO resin has been found to be extrudable, and as mentioned previously, the material must be manufactured free of contaminants. The CPO cannot contact standard ferrous steel equipment in the process of making the pellets, and the material must be extruded with a melt temperature limit below about 425° F. when compounding the initial pellets. A melt temperature of about 400° to 410° F. is preferred to avoid gel formation. The initial CPO resin starting material is preferably modified with an epoxy resin available from Shell under the designation EPON. This material also must have the highest quality cleanliness grade as described previously. Several trials were conducted blending the dry materials (CPO and epoxy resin) into pellets containing 2 percent and 4 percent EPON. Extruder barrel temperatures of 300 to 350° F. with the 4 percent EPON blend produced good melt strength to draw down as low as ½ mil.

Other extrudable resins that may be used for the TPO tie coat layer include an acrylate-based resin ADMER SE-800 from Mitsui Plastics and a urethane-based resin RGD-174 also known as MOE-II from Elf Atochem. Extrudable TPO tie coat resins also can be selected from other ethylene-vinyl acetate, acrylate, ethylene-acrylate, polypropylene-vinyl acetate and urethane-based resins in addition to chlorinated and modified chlorinated bonding materials.

The TPO starting material can be any extrudable TPO resin and a preferred TPO resin is E-1501-TF from Solvay. The TPO starting material must be manufactured and subjected to handling sufficiently that the raw material is free of defects and contaminants as mentioned previously. HEPA filtration handling and a manufacturing process that prevents introduction of foreign contaminants must be used to produce a contaminant-free starting material.

In one trial a TPO backing sheet approximately 18 mils thick was coextruded with a CPO tie layer approximately one mil thick and an acrylic size layer approximately one mil thick. Extruder operating conditions were as follows:

| Extruder | A | B | C |
|---|---|---|---|
| Extruder size (in.) | 1 | ¾ | 1 |
| Resin | TPO | CPO | Acrylic |
| Zone 1 (° F.) | 380 | 284 | 390 |
| Zone 2 (° F.) | 410 | 329 | 450 |
| Zone 3 (° F.) | 410 | 374 | 450 |
| Melt T (° F.) | 435 | | 422 |
| Pressure (psi) | 4,000 | 1,131 | 5,000 |
| Rpm | 105 | 50 | 8 |

As mentioned previously, the substrate backing sheet and bonding layers (size coat and/or tie coat) must be essentially free of defects in the finished form of the laminate so that the defects are not transmitted to the surface of the high gloss clear coat film when the base coat/clear coat film is bonded to the coextruded backing sheet and bonding layer. A coextruded backing sheet/bonding layer is considered to be defect free if a 19 to 20 mil thick extruded sheet contains on the surface of the bonding layer no more than about 3 defects in a given test area of 24 by 36 inches where each defect has a measurable size in the range of about 0.4 to 1.0 mm$^2$.

The coextrusions of this example are preferably made by coextruding the backing sheet and its bonding layer (or layers) through a polished three-roll calender stack as described in previous examples. The flexible paint film supported by its carrier is fed into the calender roll stack and laminated to the coextrusion also as described in previous examples.

What is claimed is:

1. A process for extruding a high transparency clear film from a particulate resinous starting material, comprising the steps of:

providing a solventless resinous starting material in particulate form essentially free of contaminants above about 10 microns in size, the resinous material contained in a sealed container to prevent introduction of contaminants from the ambient environment;

conveying said resinous material from the sealed container to an extrusion apparatus in a closed airflow transport system in which transport air for conveying said resinous material is subjected to high efficiency filtration to prevent introduction of contaminants above about 10 microns in size from the ambient environment into the airflow that transports the resinous material to the extrusion apparatus; and extruding the resinous material via the extrusion apparatus to form a transparent extruded clear coat film essentially free of such filtered contaminants, in which the resinous material is extrusion coated onto a traveling polymeric carrier sheet, and in which opposite sides of the carrier sheet contact tacky roll web cleaners for removing airborne particles from the carrier sheet before and after extrusion coating.

2. The process according to claim 1 in which the starting material is essentially free of particulate contaminants above about 10 microns in size, in which the sealed container prevents introduction of airborne contaminants from the ambient environment, and in which the transport air for conveying the resinous material is subjected to high efficiency particulate air (HEPA) filtration that produces HEPA filtered transport air to prevent introduction of airborne contaminants, having a particle size as low as 10 microns in size, from the ambient environment into the air flow that transports the resinous material to the extrusion apparatus.

3. The process according to claim 2 in which the resinous starting material is conveyed from the sealed container to a dryer for drying at least a portion of the resinous starting material prior to transporting the dried resinous material to the extrusion apparatus; in which the resinous material is conveyed from the sealed container to the drier via said HEPA filtered transport air; and in which the resinous material conveyed from the dryer to the extrusion apparatus is transported by said HEPA filtered transport air.

4. Apparatus according to claim 2 including extruding the resinous material via the extruding apparatus to form a transparent extruded clear coat film essentially free of such filtered contaminants, wherein the finished film is extruded to a film thickness in the range of about one to about three mils, and in which the extruded clear coat film has an average defect level of three or less defects for an extruded one mil thick film over measured average area of 1,248 sq. inches, in which measurable defect size is in the range of about 0.4 to about 1.0 mm$^2$.

5. The process according to claim 2 in which the starting material comprises a fluoropolymer resin and an acrylic resinous material, and including extruding the resinous material via the extrusion apparatus to form a transparent extruded clear coat film having a film thickness in the range of about one to about three mils essentially free of such filtered contaminants.

6. The process according to claim 1 including neutralizing static electric charges on the carrier sheet to remove attracted airborne particles from the carrier sheet prior to extrusion coating.

7. The process according to claim 1 in which the extruded clear coat film has an average defect level of 3 or less defects for an extruded one mil thick film over a measured average area of 1,248 sq. inches in which measurable defect size is in the range of about 0.4 to 1.0 mm$^2$.

8. The process according to claim 1 in which conveying air in the closed airflow transport system is filtered by high efficiency filtration capable of filtering out airborne particles above about 5 microns in size.

9. The process according to claim 8 in which such filtration is effective for filtering out airborne particles below about one micron in size.

10. The process according to claim 1 in which the starting material is 99.99% free of particulate contaminants lower than about 5 microns in size.

11. The process according to claim 1 including extruding the resinous material in a moderate compression ratio extruder having a compression ratio between about 2.5:1 to about 5:1.

12. The process according to claim 1 in which the extruded clear coat film comprises blended polyvinylidene fluoride (PVDF) and acrylic resins.

13. A process for extruding a high transparency clear film from a particulate resinous starting material, comprising the steps of:
   providing a solventless resinous starting material in particulate form essentially free of contaminants above about 10 microns in size, the resinous material contained in a sealed container to prevent introduction of contaminants from the ambient environment;
   conveying said resinous material from the sealed container to an extrusion apparatus in a closed airflow transport system in which transport air for conveying said resinous material is subjected to high efficiency filtration to prevent introduction of contaminants above about 10 microns in size from the ambient environment into the airflow that transports the resinous material to the extrusion apparatus; and
   extruding the resinous material via the extrusion apparatus to form a transparent extruded clear coat film essentially free of such filtered contaminants, in which the resinous material is extrusion coated onto a polymeric carrier sheet, and including neutralizing static electric charges on the carrier sheet to remove attracted airborne particles from the carrier sheet prior to extrusion coating.

14. The process according to claim 13 in which the starting material is essentially free of particulate contaminants above about 10 microns in size, in which the sealed container prevents introduction of airborne contaminants from the ambient environment, and in which the transport air for conveying the resinous material is subjected to high efficiency particulate air (HEPA) filtration that produces HEPA filtered transport air to prevent introduction of airborne contaminants, having a particle size as low as 10 microns in size, from the ambient environment into the air flow that transports the resinous material to the extrusion apparatus.

15. The process according to claim 14 in which the resinous starting material is conveyed from the sealed container to a dryer for drying at least a portion of the resinous starting material prior to transporting the dried resinous material to the extrusion apparatus; in which the resinous material is conveyed from the sealed container to the drier via said HEPA filtered transport air; and in which the resinous material conveyed from the dryer to the extrusion apparatus is transported by said HEPA filtered transport air.

16. Apparatus according to claim 14 including extruding the resinous material via the extruding apparatus to form a transparent extruded clear coat film essentially free of such filtered contaminants, wherein the finished film is extruded to a film thickness in the range of about one to about three mils, and in which the extruded clear coat film has an average defect level of three or less defects for an extruded one mil thick film over measured average area of 1,248 sq. inches, in which measurable defect size is in the range of about 0.4 to about 1.0 mm$^2$.

17. The process according to claim 13 in which the starting material comprises a fluoropolymer resin and an acrylic resinous material, and including extruding the resinous material via the extrusion apparatus to form a transparent extruded clear coat film having a film thickness in the range of about one to about three mils essentially free of such filtered contaminants.

18. The process according to claim 13 in which the extruded clear coat film has an average defect level of 3 or less defects for an extruded one mil thick film over a measured average area of 1,248 sq. inches in which measurable defect size is in the range of about 0.4 to 1.0 mm$^2$.

19. The process according to claim 13 in which conveying air in the closed airflow transport system is filtered by high efficiency filtration capable of filtering out airborne particles above about 5 microns in size.

20. The process according to claim 19 in which such filtration is effective for filtering out airborne particles below about one micron in size.

21. The process according to claim 13 in which the starting material is 99.99% free of particulate contaminants lower than about 5 microns in size.

22. The process according to claim 13 including extruding the resinous material in a moderate compression ratio extruder having a compression ratio between about 2.5:1 to about 5:1.

23. The process according to claim 13 in which the extruded clear coat film comprises blended polyvinylidene fluoride (PVDF) and acrylic resins.

24. A process for extruding a high transparency clear film from a particulate resinous starting material, comprising the steps of:

providing a solventless resinous starting material in particulate form essentially free of contaminants above about 10 microns in size, the resinous material contained in a sealed container to prevent introduction of contaminants from the ambient environment;

conveying said resinous material from the sealed container to an extrusion apparatus in a closed airflow transport system in which transport air for conveying said resinous material is subjected to high efficiency filtration to prevent introduction of contaminants above about 10 microns in size from the ambient environment into the airflow that transports the resinous material to the extrusion apparatus; and extruding the resinous material via the extrusion apparatus to form a transparent extruded clear coat film essentially free of such filtered contaminants, in which the transporting and extruding steps are carried out in a high efficiency air filtered clean room environment which exceeds a class 10,000 rating.

25. The process according to claim 24 in which the vicinity of the extrusion die is contained within a clean room environment which exceeds a class 2,000 rating.

26. A process for extruding a high transparency clear film from a particulate resinous starting material, comprising the steps of:

preparing the resinous starting material in a high efficiency air filtered clean room environment which exceeds a class 10,000 rating;

providing a solventless resinous starting material in particulate form essentially free of contaminants above about 10 microns in size, the resinous material contained in a sealed container to prevent introduction of contaminants from the ambient environment;

conveying said resinous material from the sealed container to an extrusion apparatus in a closed airflow transport system in which transport air for conveying said resinous material is subjected to high efficiency filtration to prevent introduction of contaminants above about 10 microns in size from the ambient environment into the airflow that transports the resinous material to the extrusion apparatus; and extruding the resinous material via the extrusion apparatus to form a transparent extruded clear coat film essentially free of such filtered contaminants.

\* \* \* \* \*